United States Patent
Nishizawa

(10) Patent No.: US 9,615,045 B2
(45) Date of Patent: Apr. 4, 2017

(54) IMAGE CAPTURING APPARATUS AND METHOD FOR CONTROLLING THE IMAGE CAPTURING APPARATUS

(71) Applicant: CANON KABUSHIKI KAISHA, Tokyo (JP)

(72) Inventor: Hideta Nishizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/561,793

(22) Filed: Dec. 5, 2014

(65) Prior Publication Data
US 2015/0163437 A1    Jun. 11, 2015

(30) Foreign Application Priority Data
Dec. 9, 2013 (JP) ................................. 2013-254492

(51) Int. Cl.
*H04N 5/378* (2011.01)
*H04N 5/355* (2011.01)
(Continued)

(52) U.S. Cl.
CPC ......... *H04N 5/378* (2013.01); *H04N 5/35554* (2013.01); *H04N 5/37452* (2013.01); *H04N 5/3559* (2013.01)

(58) Field of Classification Search
CPC ............ H04N 5/35554; H04N 5/3559; H04N 5/37452; H04N 5/378; H01L 27/146; H01L 27/14634; H01L 27/14603
(Continued)

(56) References Cited

U.S. PATENT DOCUMENTS 7,045,888 B2 * 5/2006 Tsai ................... H01L 23/4951
257/686
7,405,760 B2 * 7/2008 Cho ..................... H04N 5/2253
348/340
(Continued)

FOREIGN PATENT DOCUMENTS

JP    2011-217315 A    10/2011
KR    10-2010-0080622 A    7/2010
KR    10-2013-0018545 A    2/2013

OTHER PUBLICATIONS

The above foreign patent documents were cited in the Oct. 10, 2016 Korean Office Action, which is enclosed without an English Translation, that issued in Korean Patent Application No. 10-2014-0174792.

*Primary Examiner* — Lin Ye
*Assistant Examiner* — Marly Camargo
(74) *Attorney, Agent, or Firm* — Cowan, Liebowitz & Latman, P.C.

(57) ABSTRACT

An image capturing apparatus comprises an image sensor and a generation unit configured to generate a signal of each of the pixels from the signals respectively read out from the plurality of charge accumulation units. The image sensor includes a plurality of pixels, each of the pixels including: a photoelectric conversion unit; a plurality of charge accumulation units for accumulating a charge generated in the photoelectric conversion unit; a control unit configured to control accumulation of charge in each of the plurality of charge accumulation units; and a readout unit configured to read out a signal corresponding to the charge from each of the plurality of charge accumulation units. The photoelectric conversion unit is formed in a first chip, and the plurality of charge accumulation units, the control unit, and the readout unit are formed in a second chip.

35 Claims, 26 Drawing Sheets

(51) Int. Cl.
  *H04N 5/374* (2011.01)
  *H01L 27/146* (2006.01)
  *H04N 5/3745* (2011.01)
(58) Field of Classification Search
  USPC ..... 348/296, 294, 308, 222.1; 257/291, 292,
  257/226; 250/208.1
  See application file for complete search history.

(56) References Cited

U.S. PATENT DOCUMENTS

| | | | |
|---|---|---|---|
| 2007/0272828 A1* | 11/2007 | Xu | H04N 5/361 |
| | | | 250/208.1 |
| 2010/0276572 A1* | 11/2010 | Iwabuchi | H01L 27/1464 |
| | | | 250/208.1 |
| 2010/0321532 A1* | 12/2010 | Hashimoto | H04N 5/2351 |
| | | | 348/234 |
| 2013/0308027 A1* | 11/2013 | Jenkin | H04N 5/347 |
| | | | 348/302 |
| 2013/0314573 A1* | 11/2013 | Tsukimura | H04N 5/335 |
| | | | 348/302 |
| 2014/0211056 A1* | 7/2014 | Fan | H01L 27/14643 |
| | | | 348/308 |

* cited by examiner

F I G. 26A
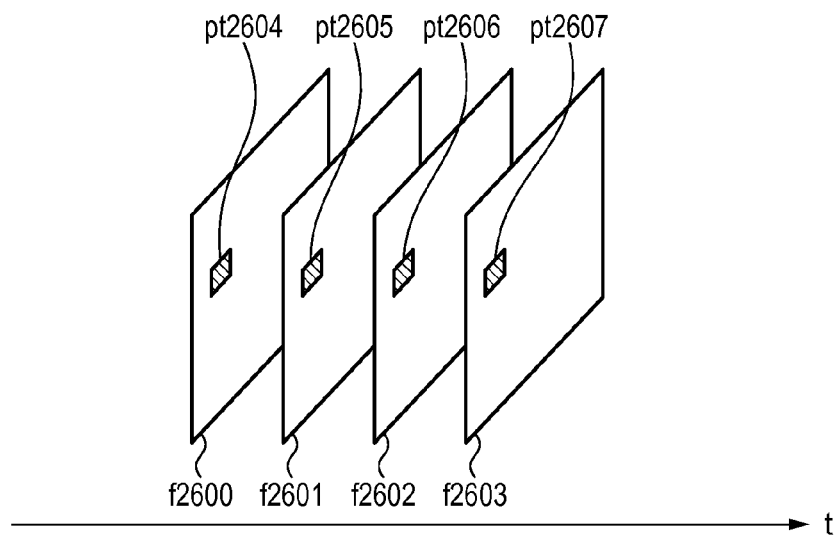
F I G. 26B
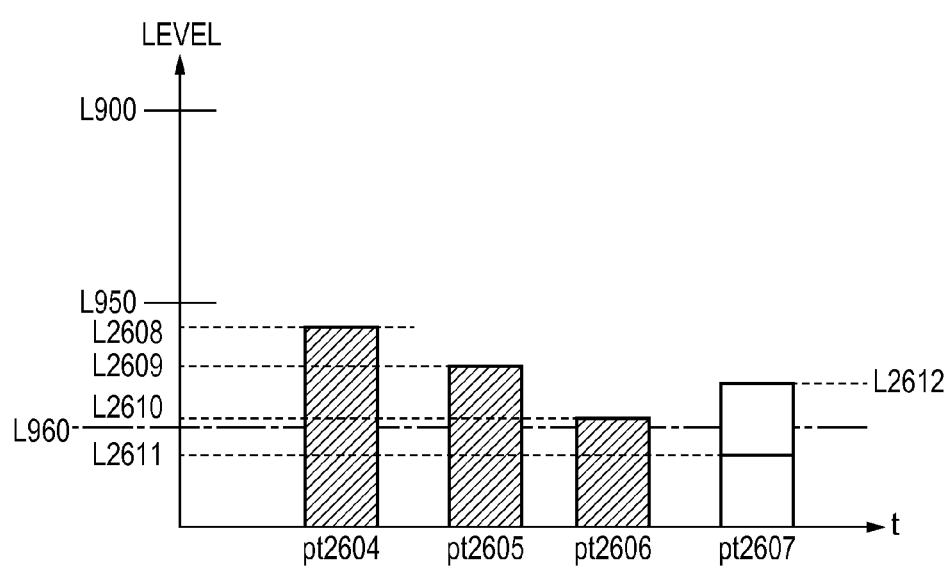

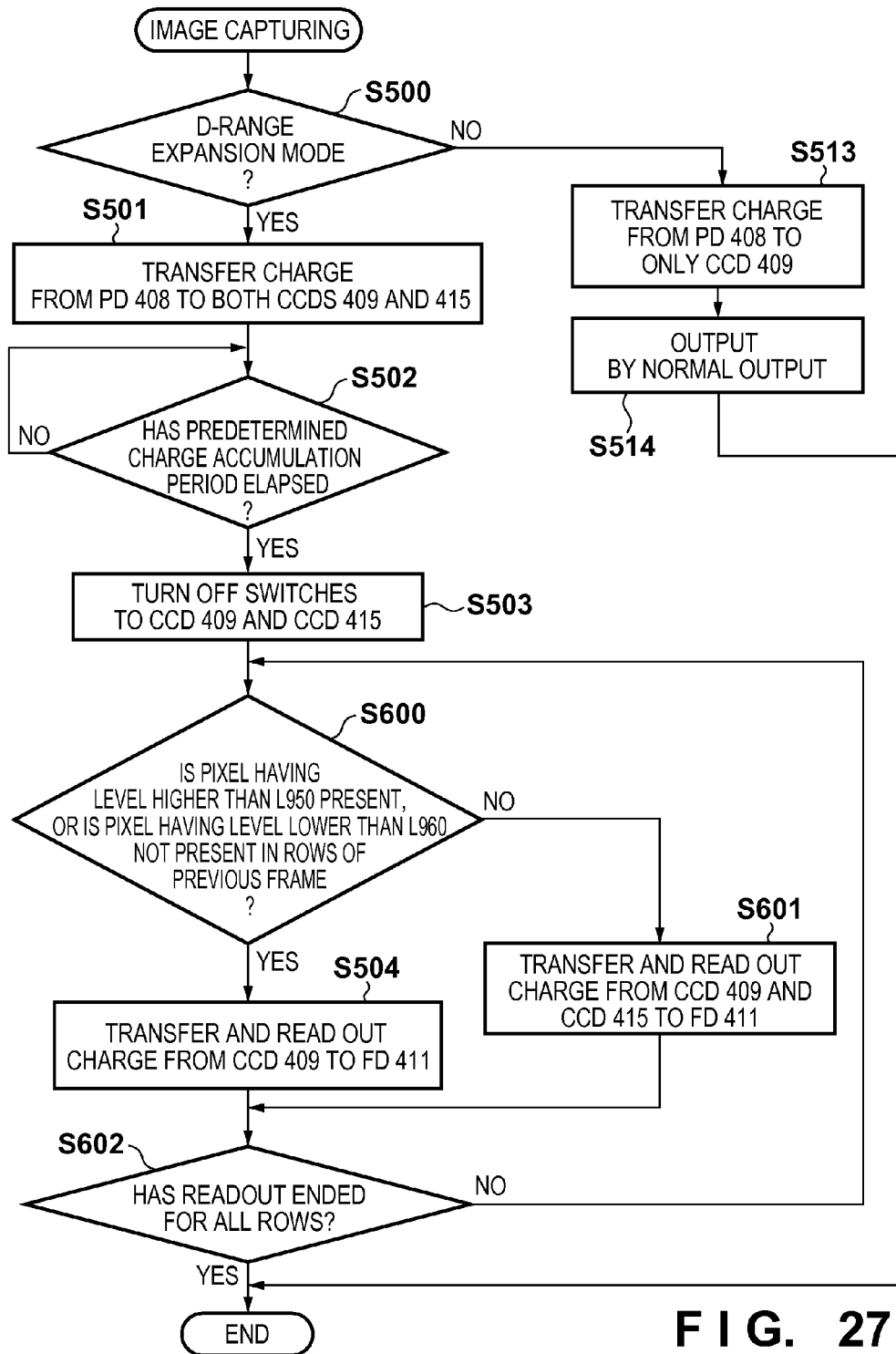
F I G. 27

IMAGE CAPTURING APPARATUS AND METHOD FOR CONTROLLING THE IMAGE CAPTURING APPARATUS

BACKGROUND OF THE INVENTION

Field of the Invention

The present invention relates to an image capturing apparatus that uses an image sensor typified by a CMOS image sensor, and a method for controlling the image capturing apparatus.

Description of the Related Art

An increasing number of recent electronic cameras and video cameras include a CMOS image sensing device mounted thereon. A commonly used CMOS image sensing device employs a scheme in which signal charges generated and accumulated in photoelectric conversion units of pixels arranged in a two-dimensional matrix are sequentially read out on a row-by-row basis. In recent years, a simultaneous image capturing function (global shutter function) of accumulating signal charges at the same timing has been proposed, and the applications of a CMOS image sensing element having the global shutter function are also increasing.

According to Japanese Patent Laid-Open No. 2011-217315, a plurality of CCDs serving as charge holding units arranged in series are provided in each pixel, and the dynamic range is expanded by obtaining signals with different accumulation periods of time. However, the provision of a plurality of CCDs in a single pixel in a solid-state image capturing apparatus including an increasing number of pixels results in a reduction in size of the photodiode portion serving as a photoelectric conversion unit, and thus may reduce the sensitivity.

According to Japanese Patent Laid-Open No. 2011-217315, the output from the sensor is performed for one row at a time even though the global shutter is used, and therefore, it takes a long readout period of time to obtain signals with different accumulation periods of time. Furthermore, according to Japanese Patent Laid-Open No. 2011-217315, the charge holding portion is disposed in each of the pixels of a first chip, and therefore, the size of the photodiode portion is equivalent to that of the conventional counterpart.

SUMMARY OF THE INVENTION

The present invention has been made in consideration of the above situation, and provides an image with a wide dynamic range, without reducing the size of the photodiode portion.

According to the present invention, provided is an image capturing apparatus, comprising: an image sensor including a plurality of pixels, each of the pixels including: a photoelectric conversion unit; a plurality of charge accumulation units for accumulating a charge generated in the photoelectric conversion unit; a control unit configured to control accumulation of charge in each of the plurality of charge accumulation units; and a readout unit configured to read out a signal corresponding to the charge from each of the plurality of charge accumulation units; and a generation unit configured to generate a signal of each of the pixels from the signals respectively read out from the plurality of charge accumulation units, wherein the photoelectric conversion unit is formed in a first chip, and the plurality of charge accumulation units, the control unit, and the readout unit are formed in a second chip.

Further, according to the present invention, provided is an image capturing apparatus comprising: an image sensor including a plurality of pixels, each of the pixels including: a photoelectric conversion unit; a plurality of charge accumulation units for accumulating a charge generated in the photoelectric conversion unit; a charge holding unit configured to hold the charges transferred from the plurality of charge accumulation units; a control unit configured to control accumulation of charge in each of the plurality of charge accumulation units; a transfer unit configured to transfer the charges from the plurality of charge accumulation units to the charge holding unit; and a readout unit configured to read out each of signals corresponding to the charges held in the charge holding unit; and a generation unit configured to generate a signal of each of the pixels from the signals read out from the charge holding unit, wherein the photoelectric conversion unit is formed in a first chip, and the plurality of charge accumulation units, the charge holding unit, the control unit, the transfer unit, and the readout unit are formed in a second chip.

Furthermore, according to the present invention, provided is a method for controlling an image capturing apparatus including: an image sensor including a plurality of pixels, each of the pixels including: a photoelectric conversion unit and a plurality of charge accumulation units for accumulating a charge generated in the photoelectric conversion unit, a control unit and a readout unit, wherein the photoelectric conversion unit is formed in a first chip, and the plurality of charge accumulation units, the control unit, and the readout unit are formed in a second chip, the method comprising: a charge accumulation step of controlling, by the control unit, accumulation of charge in each of the plurality of charge accumulation units; a readout step of reading out, by the readout unit, a signal corresponding to the charge from each of the plurality of charge accumulation units; and a generation step of generating, by a generation unit, a signal of each of the pixels from the signals respectively read out from the plurality of charge accumulation units in the readout step.

Further, according to the present invention, provided is a method for controlling an image capturing apparatus including: an image sensor including a plurality of pixels, each of the pixels including: a photoelectric conversion unit; a plurality of charge accumulation units for accumulating a charge generated in the photoelectric conversion unit; a charge holding unit configured to hold charges transferred from the plurality of charge accumulation units, a control unit, a transfer unit, and a readout unit wherein the photoelectric conversion unit is formed in a first chip, and the plurality of charge accumulation units, the charge holding unit, the control unit, the transfer unit, and the readout unit are formed in a second chip, the method comprising: a control step of controlling, by the control unit, accumulation of charge in each of the plurality of charge accumulation units; a transfer step of transferring, by the transfer unit, the charges from the plurality of charge accumulation units to the charge holding unit; a readout step of reading out, by the readout unit, each of signals corresponding to the charges held in the charge holding unit; and a generation step of generating, by a generation unit, a signal of each of the pixels from the signals respectively read out from the plurality of charge accumulation units.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodi

FIGS. 26A and 26B are diagrams illustrating addition control according to a sixth embodiment;

FIG. 27 is a flowchart illustrating readout control of an image sensor according to the sixth embodiment.

DESCRIPTION OF THE EMBODIMENTS

Exemplary embodiments of the present invention will be described in detail in accordance with the accompanying drawings.

First Embodiment

Figure 1:
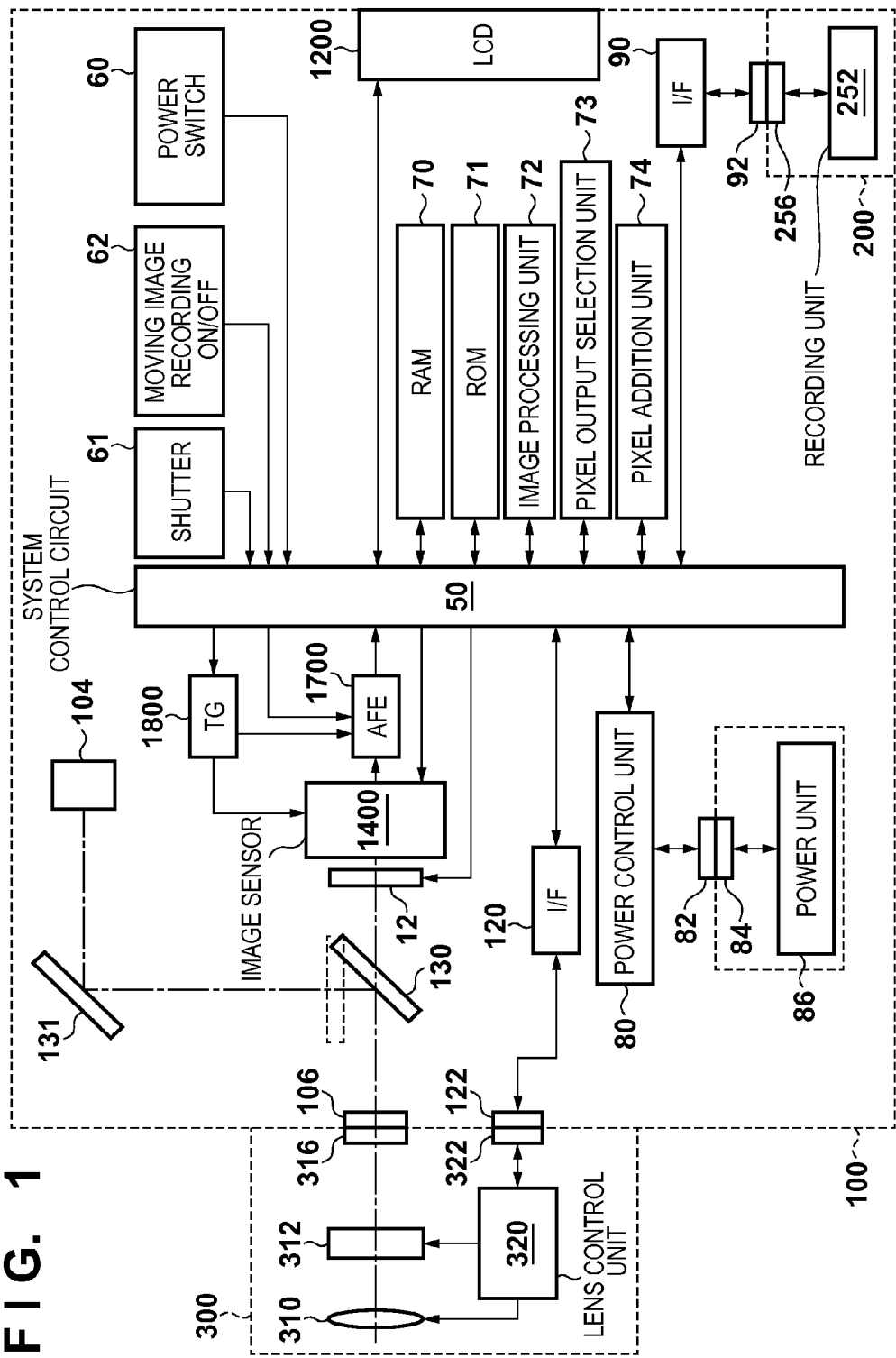
- FIG. 1 is a block diagram showing a schematic configuration of an image capturing apparatus according to a first embodiment of the present invention.

FIG. 1 is a block diagram showing a configuration of an image capturing apparatus according to a first embodiment of the present invention. The image capturing apparatus mainly includes an image processing apparatus 100, a recording medium 200 such as a memory card or a hard disk, and a lens unit 300.

The lens unit 300 includes a taking lens 310, an aperture 312, a lens mount 316, a lens control unit 320, and a connector 322. The lens mount 316 mechanically connects the lens unit 300 to a lens mount 106 of the image processing apparatus 100. The connector 322 is electrically connected to the image processing apparatus 100 via a connector 122 on the image processing apparatus 100 side. The lens control unit 320 receives a signal from the image processing apparatus 100 via the connectors 322 and the 122, and performs focus adjustment by changing the position of the taking lens 310 on the optical axis in accordance with the received signal. The lens control unit 320 receives a signal from the image processing apparatus 100 in the same manner, and controls the opening of the aperture 312.

In the image processing apparatus 100, an image of incident light made incident is formed via mirrors 130 and 131 when the mirror 130 is on the optical axis, and the user can check, from an optical finder 104, the framing of a still image being captured. An image sensor 1400 includes column AD circuits and timing control blocks, which will be described below, and photoelectrically converts an optical image made incident via the lens unit 300 into an electric signal when the mirror 130 is withdrawn from the optical axis. A shutter 12 controls the amount of exposure to the image sensor 1400.

An analog front end (AFE) 1700 contains an A/D converter that converts an analog signal output from the image sensor 1400 into a digital signal. A timing generator (TG) 1800 supplies a clock signal and a control signal to the image sensor 1400 and the A/D converter of the AFE 1700. A system control circuit 50 (hereinafter, referred to as "CPU") performs overall control of the image processing apparatus 100, including image processing.

A monitor 1200 is constituted by a liquid crystal display (LCD) or the like, and is capable of displaying a live-view image and a captured still image. A shutter switch 61 is used for instructing capturing of a still image, and has a two-stage configuration. In response to an operation of pressing shallow to the first stage, or the so-called half-pressing operation, automatic focus adjustment and automatic exposure control including setting of the shutter speed and the numerical aperture by an automatic exposure mechanism in the state before capturing are performed. In response to an operation of pressing deep to the second stage, or the so-called full-pressing operation, the shutter 12 is operated to perform a capturing operation. A moving image recording start/stop switch 62 is used for instructing recording of a moving image, and the moving image recording operation is continuously performed after the start of recording has been instructed.

A power switch 60 serves to switch between power-on and power-off of the image processing apparatus 100. In addition, the setting for power-on and power-off of various accessory devices connected to the image processing apparatus 100, such as the lens unit 300, an external flash, and the recording medium 200 can be switched accordingly.

A volatile memory (RAM) 70 temporarily records image data output from the image sensor 1400 and image data that has been subjected to image processing in an image processing unit 72. The RAM 70 also has the function of a work memory of the CPU 50. A nonvolatile memory (ROM) 71 stores a program used when the CPU 50 performs operations. The image processing unit 72 performs processing such as correction and compression of a still image. When there are a plurality of outputs from each pixel as will be described below, a pixel output selection unit 73 selects an output of an appropriate level from these outputs. When there are a plurality of outputs from each pixel as will be described below, a pixel addition unit 74 adds these outputs.

A power control unit 80 is composed of, for example, a battery detection circuit, a DC-DC converter, and a switch circuit for switching a block to which a current is to be applied. Furthermore, the power control unit 80 detects the mounting of a battery, the type of the battery, and the remaining battery power, and controls a DC-DC converter based on the result of detection and an instruction from the CPU 50, and supplies a necessary voltage to various parts including the recording medium for a necessary period. The power control unit 80 is connected to a power unit 86 via connectors 82 and 84. The power unit 86 is constituted by a primary battery such as an alkaline battery or a lithium battery, a secondary battery such as a Li-ion battery, an AC adapter, or the like.

An interface 90 performs communications with the recording medium 200 to which it is electrically connected via a connector 92. The recording medium 200 is a recording medium such as a memory card or a hard disk, and includes a recording unit 252 constituted by a semiconductor memory, a magnetic disk or the like, and a connector 256 to the image processing apparatus 100.

An interface 120 communicates via an electric signal with the lens unit 300 to which it is electrically connected via the connector 122. The lens mount 106 mechanically connects the lens unit 300.

Figure 2:
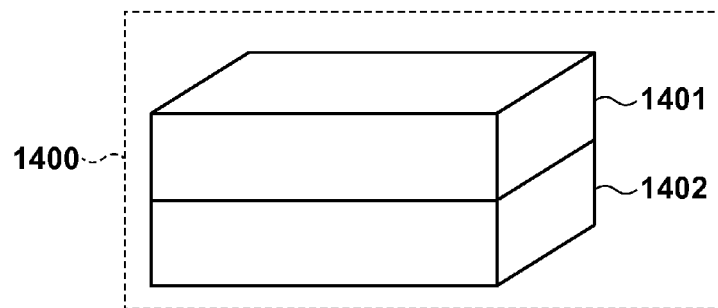
FIG. 2 is a schematic diagram of a stacked structure of an image sensor according to the first embodiment.

The image sensor 1400 according to the present embodiment has a stacked structure. FIG. 2 is an oblique projection showing an overview thereof. In the image sensor 1400, a first chip 1401 including a light-receiving portion and a second chip 1402 including a charge holding unit are stacked on each other at the chip level. In the first chip 1401, a portion including a photoelectric conversion unit (photodiode, hereinafter referred to as "PD") inside a pixel unit 206, which will be described below, is formed. The second chip 1402 is formed by a circuit including a charge-coupled device (hereinafter, referred to as "CCD") serving as a charge holding unit that temporarily holds data transferred from the PD.

Figure 3:
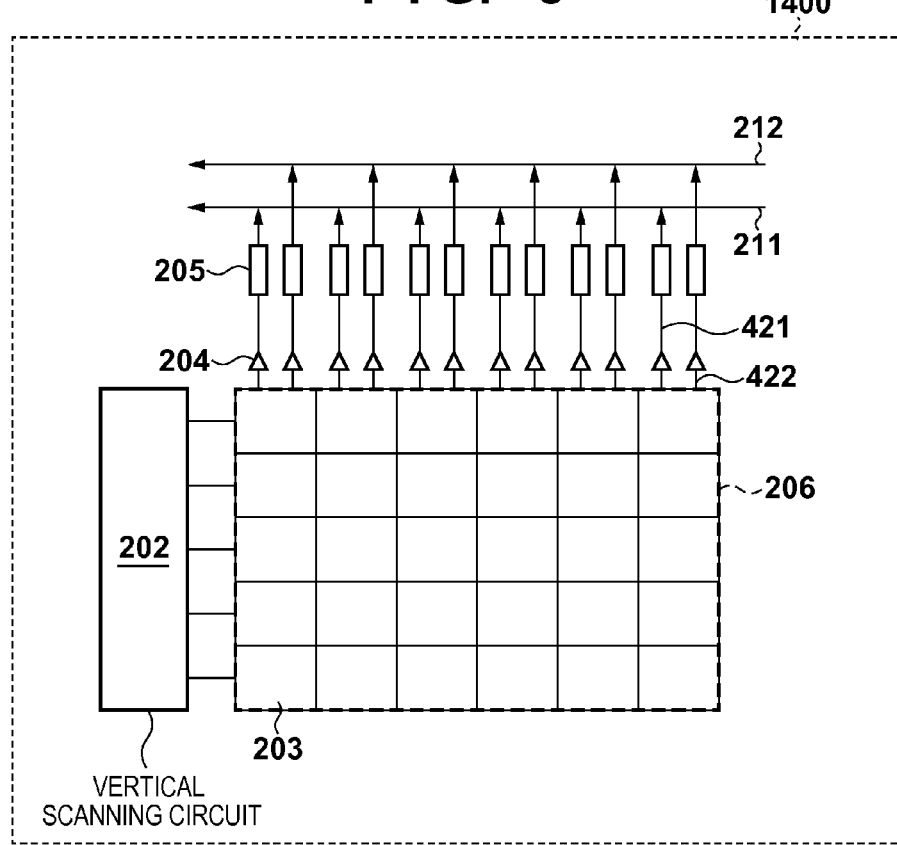
FIG. 3 is a block diagram showing a configuration of the image sensor according to the first embodiment.

FIG. 3 is a block diagram showing a configuration of the image sensor 1400. Pixels 203 are arranged in a matrix. Hereinafter, a vertical array is referred to as "column", and a horizontal array is referred to as "row". A pixel unit 206 is a collection of all the columns and rows of the pixels 203. A vertical scanning circuit 202 outputs a signal required for row selection to read out a selected row and for readout of charges of each row to the circuit of each pixel.

The pixels 203 of each column are connected to two vertical output lines 421 and 422. The signals output to the vertical output lines 421 and 422 are output to horizontal output lines 211 and 212, respectively, via column amplifiers 204 and column circuits 205. Signal outputs for a single row that are output to the horizontal output lines 211 and 212 are sequentially output in the horizontal direction by the driving of a horizontal scanning circuit (not shown).

Figure 4A:
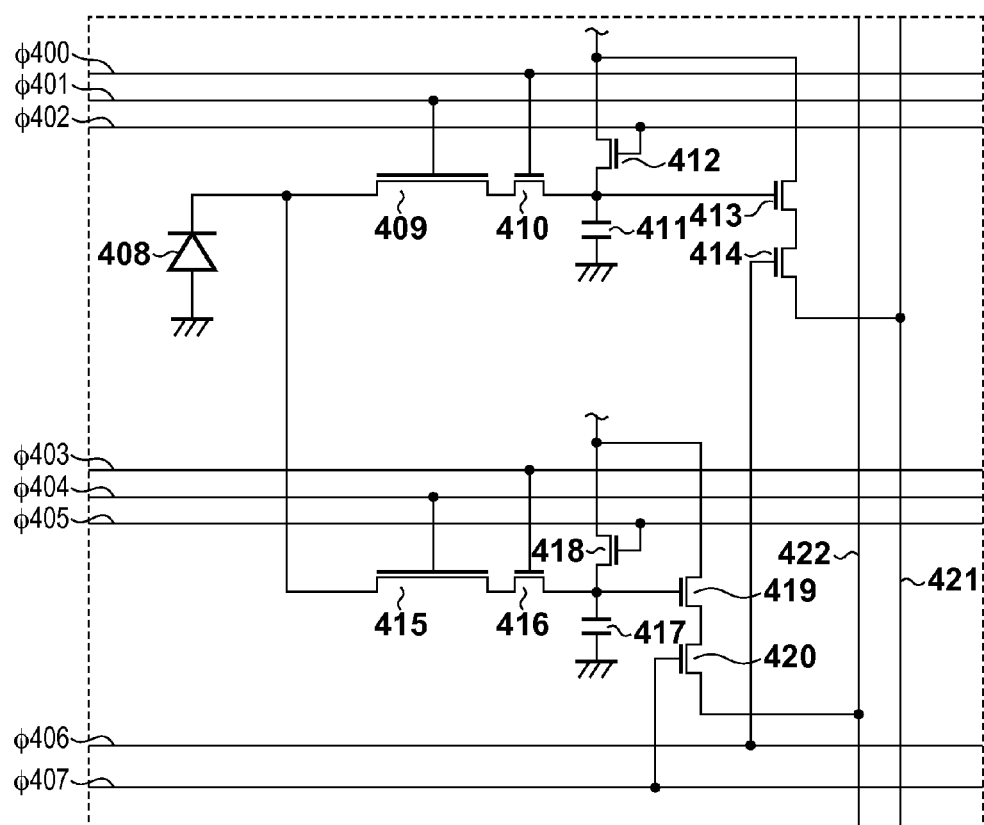
FIGS. 4A and 4B are an equivalent circuit diagram and a cross-sectional view, respectively, of a pixel according to the first embodiment.
Figure 4B:
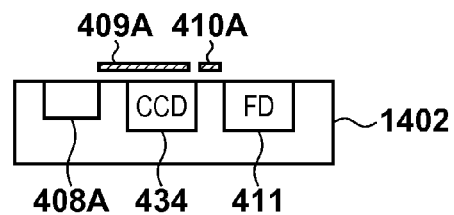

FIG. 4A shows an equivalent circuit diagram of a pixel 203. FIG. 4B shows a cross-sectional view of the pixel 203. In FIG. 4A, a charge that is generated and accumulated in a PD 408 is temporarily held in CCDs 409 and 415 by controlling CCD control signals φ401 and φ404. The charge held in the CCD 409 is transferred to a floating diffusion unit (hereinafter, referred to as "FD") 411 by controlling a transfer switch 410 using a transfer control signal φ400. A source follower amplifier 413 amplifies the voltage based on the charge accumulated in the FD 411, and outputs the amplified voltage as a pixel signal. The output pixel signal is output to the vertical output line 421 by controlling a row selection switch 414 using a row selection control signal φ406. Although the CCDs 409 and 415 are directly connected to the PD 408 in FIG. 4A, another MOS transistor may be connected between the PD 408 and the CCD 409 as a transfer gate. Here, the PD 408 is formed in the first chip 1401, and the remaining portions are formed in the second chip 1402.

Meanwhile, the charge held in the CCD 415 is transferred to a floating diffusion unit (FD) 417 by controlling a transfer switch 416 using a transfer control signal φ403. A source follower amplifier 419 amplifies the voltage based on the charge accumulated in the FD 417, and outputs the amplified voltage as a pixel signal. The output pixel signal is output to the vertical output line 422 by controlling a row selection switch 420 using a row selection control signal φ407.

To reset unnecessary charges accumulated in the FDs 411 and 417, reset switches 412 and 418 are controlled using reset control signals φ402 and φ405, respectively. The reset of the PD 408 will be described later.

The CCD control signals φ401 and φ404, the transfer control signals φ400 and φ403, the reset control signals φ402 and φ405, and the row selection control signals φ406 and φ407 are output from the vertical scanning circuit 202 by being controlled by the CPU 50 via the TG 1800.

FIG. 4B shows a portion of the stacked sensor where each component of the second chip 1402 in the equivalent circuit shown in FIG. 4A is disposed. The charge accumulation portion corresponding to the charge accumulated in the PD 408 of the first chip 1401 is a charge holding unit 408A, and the charge generated in the PD 408 is transferred to the charge holding unit 408A of the second chip 1402. Here, the boundary between the first chip 1401 and the second chip 1402 may be connected by a method using a technique such as microbump. The CCD 409 is disposed adjacent to the charge holding unit 408A. The CCD 409 includes a gate electrode 409A and a CCD charge holding unit 434, and a transfer switch 410A and the FD 411 are disposed adjacent to the CCD 409. Although not shown, the CCD 415 is also disposed adjacent to the charge holding unit 408A, as with the CCD 409. The transfer switch 416 and the FD 417 are disposed in the same manner.

Figure 5:
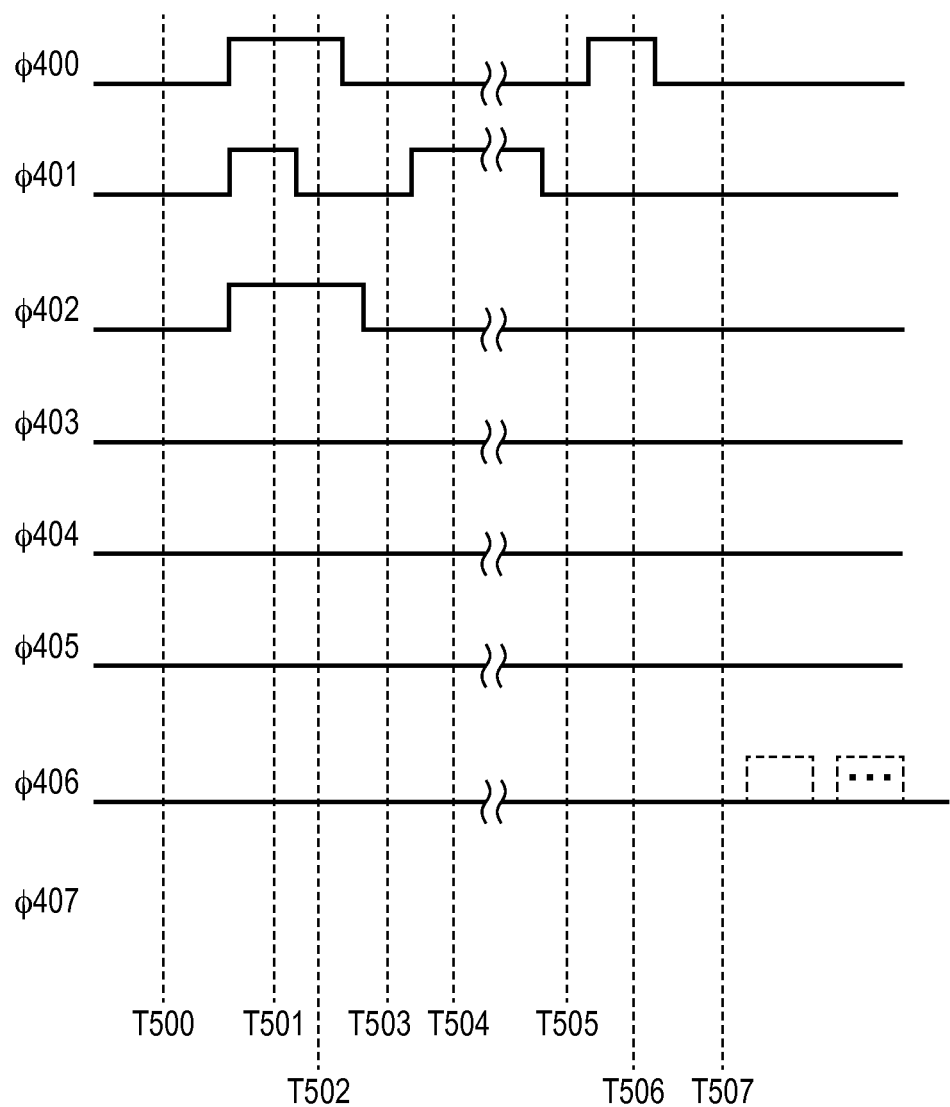
FIG. 5 is a timing chart showing a pixel driving pattern according to a conventional technique.
Figure 6:
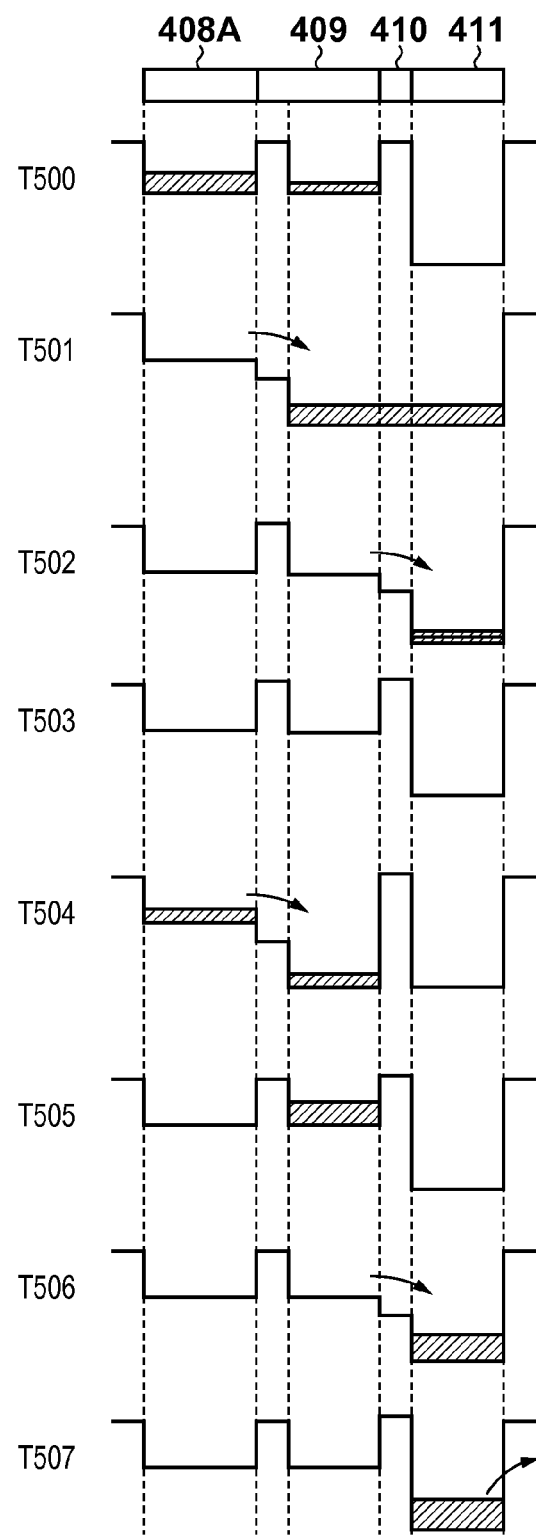
FIG. 6 is a potential transition diagram according to a conventional technique.

Next, with reference to FIGS. 5 and 6, a description will be given of the reset operation of the PD 408 and the charge transfer by the conventional technique that uses only one of the CCDs (here, the CCD 409). FIG. 5 is a timing chart of control signals in normal readout. FIG. 6 shows a potential transition diagram in normal readout. Note that in the potential transition diagrams shown in the following, the potential for electrons is lower (electric potential is higher) in the down direction. In addition, the control of the control signals φ400 to φ407 shown in FIG. 5 is performed by the CPU 50 via TG 1800 and the vertical scanning circuit 202.

At timing T500, which is prior to readout, excess charges remain in the charge holding unit 408A and the CCD 409 (T500 in FIG. 6), and therefore, these charges need to be reset. Between timings T500 and T501, the transfer control signal φ400, the CCD control signal φ401, and the reset control signal φ402 are set to HIGH. As a result, the potential of the CCD 409 is lowered at timing T501, and the potential of the transfer switch 410 is also lowered. Thereby, the excess charges that have been present in the charge holding unit 408A and the CCD 409 are transferred to the CCD 409 and the FD 411 (T501 in FIG. 6). At this time, the reset control signal φ402 is HIGH, so that the charge in the FD 411 is discharged.

Between timings T501 and T502, the CCD control signal φ401 is set to LOW to raise the potential of the CCD 409. Thereby, all the unnecessary charges remaining in the CCD 409 are transferred to the FD 411 (T502 in FIG. 6).

Between timings T502 and T503, the transfer control signal φ400 is set to LOW. After all the unnecessary charges have been successfully removed, the reset control signal φ402 is also set to LOW (T503 in FIG. 6).

Between timings T503 and T504, the accumulation of charge is started. Then, in order to transfer, to the CCD 409, the charge that is generated in the PD 408 and is transferred to the charge holding unit 408A during the charge accumulation period, the CCD control signal φ401 is set to HIGH (T504 in FIG. 6).

After a predetermined charge accumulation period has elapsed since the accumulation of charge was started, the CCD control signal φ401 is set to LOW immediately before timing T505. At timing T505, the charge generated in the PD 408 has been moved to the CCD 409 and is held there (T505 in FIG. 6).

Between timings T505 and T506, the transfer control signal φ400 is set to HIGH. Thereby, at timing T506, the charge held in the CCD 409 is transferred to the FD 411 (T506 in FIG. 6).

Between timings T506 and T507, the transfer control signal φ400 is set to LOW. Thereby, at timing T507, the charges in all pixels have been transferred to the FDs 411 (T507 in FIG. 6). After timing T507, the row selection control signal φ406 is set to HIGH on a row-by-row basis, and thereby, the voltage of the FD 411 in which the charge is held is amplified by the source follower amplifier 413, and is output to the vertical output line 421.

Figure 7:
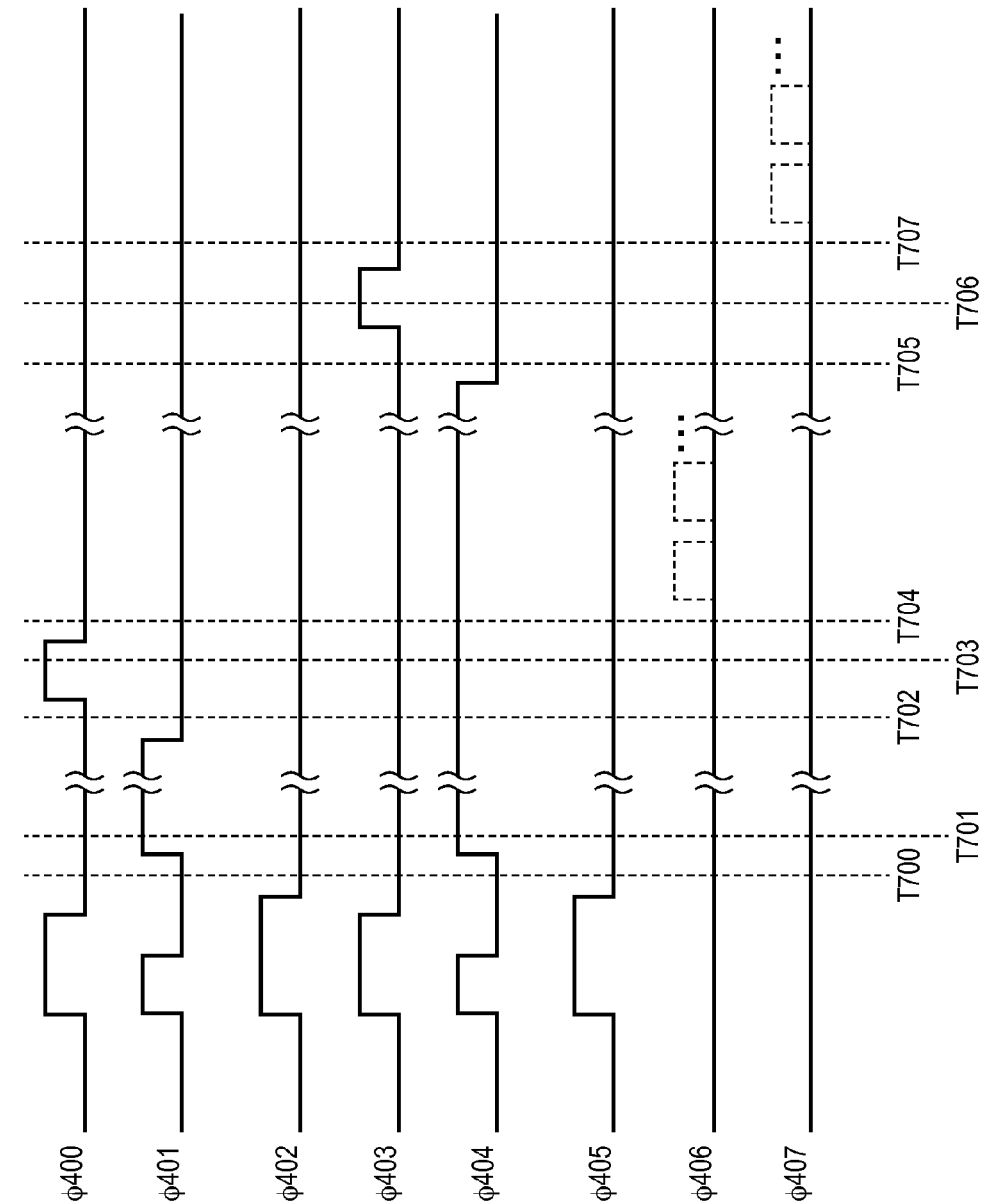
FIG. 7 is a timing chart showing a pixel driving pattern according to the first embodiment.
Figure 8:
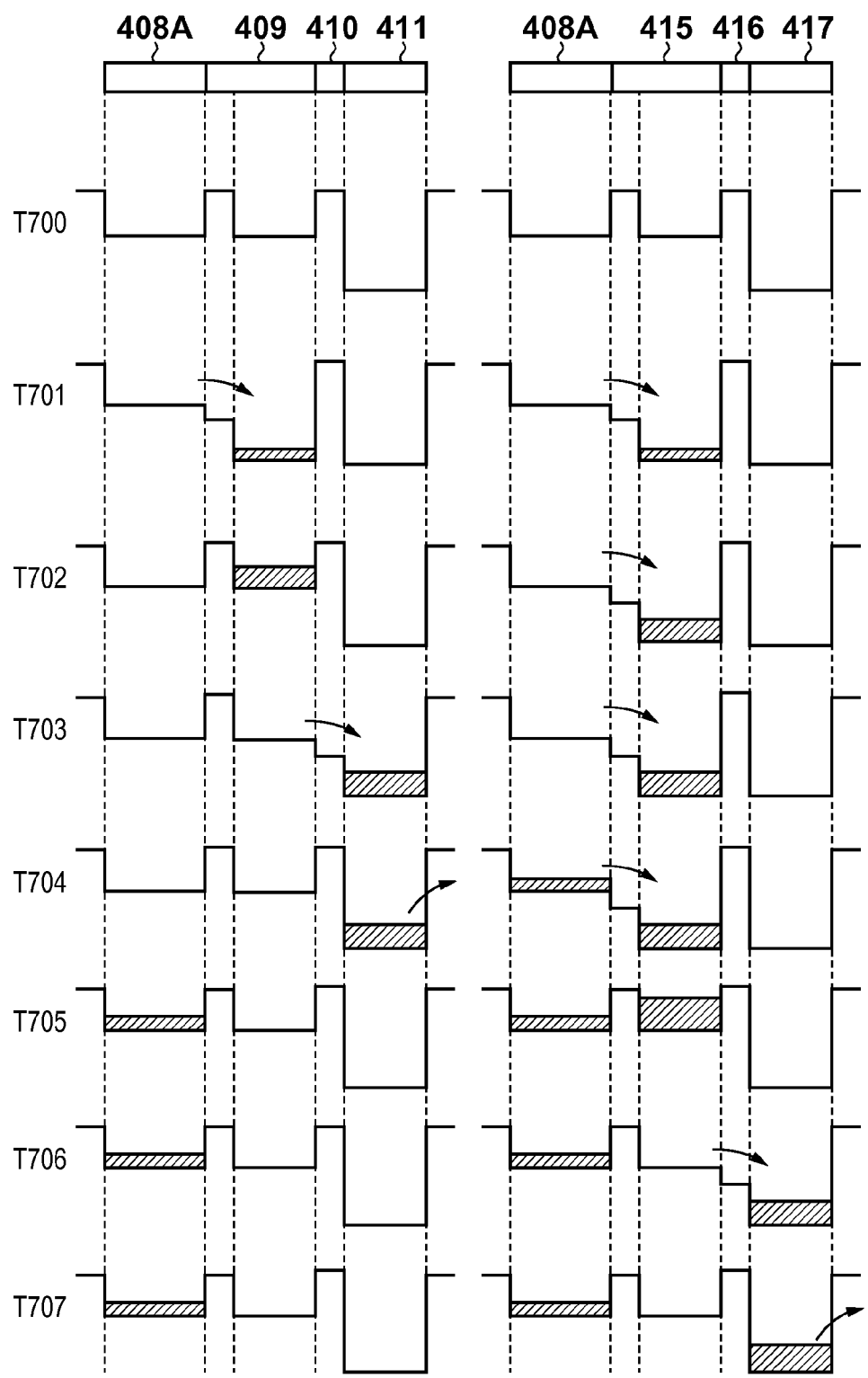
FIG. 8 is a potential transition diagram according to the first embodiment.

Next, with reference to FIGS. 7 and 8, a description will be given of the charge transfer by a readout scheme that uses both of the CCDs 409 and 415 according to the first embodiment. FIG. 7 shows a timing chart of control signals according to the first embodiment. FIG. 8 shows a potential transition diagram according to the first embodiment. Note that the control of the control signals φ400 to φ407 shown in FIG. 7 is also performed by the CPU 50 via the TG 1800 and the vertical scanning circuit 202.

First, the same control as that performed at timings T500 to T503 in FIGS. 5 and 6 is performed as the reset operation, and therefore, the detailed description shall be omitted. However, in the readout scheme that uses both of the CCDs 409 and 415 according to the first embodiment, the control signals φ403 to φ405 are controlled in the same manner as the control signals φ400 to φ402. After resetting, at timing T700, all the excess charges in the charge holding unit 408A, the CCD 409, the CCD 415, the FD 411, and the FD 417 have been reset (T700 in FIG. 8).

Between timings T700 and T701, the accumulation of charge is started. The CCD control signals φ401 and φ404 are set to HIGH, and thereby, at timing T701, the charge generated in the PD 408 during the charge accumulation period is transferred to each of the CCDs 409 and 415 via the charge holding unit 408A (T701 in FIG. 8).

After a predetermined charge accumulation period has elapsed since the accumulation of charge was started, the CCD control signal φ401 is set to LOW immediately before timing T702, and the potential of the CCD 409 is raised at timing T702 (T702 in FIG. 8). Accordingly, from timing T702 and onward, the charge generated in the PD 408 is transferred only to the CCD 415 (T702 to T704 in FIG. 8).

Between timings T702 and T703, the transfer control signal φ400 is set to HIGH. Thereby, at timing T703, the charge that has been held in the CCD 409 is transferred to the FD 411 (T703 in FIG. 8).

Between timings T703 and T704, the transfer control signal φ400 is set to LOW. Thereby, at timing T704, the charges in all pixels have been transferred to the FDs 411 (T704 in FIG. 8). After timing T704, the row selection control signal φ406 is set to HIGH on a row-by-row basis, and thereby the voltage of the FD 411 in which the charge is held is amplified by the source follower amplifier 413, and is output to the vertical output line 421.

On the other hand, the CCD control signal φ404 is set to LOW immediately before timing T705. Thereby, at timing T705, the potential of the CCD 415 is raised, and the transfer from the charge holding unit 408A to the CCD 415 is stopped (T705 in FIG. 8).

Between timings T705 and T706, the transfer control signal φ403 is set to HIGH. Thereby, at timing T706, the charge that has been held in the CCD 415 is transferred to the FD 417 (T706 in FIG. 8).

Between timings T706 and T707, the transfer control signal φ403 is set to LOW. Thereby, at timing T707, the charges in all pixels have been transferred to the FDs 417 (T707 in FIG. 8). After timing T707, the row selection control signal φ407 is set to HIGH on a row-by-row basis, and thereby the voltage of the FD 417 in which the charge is held is amplified by the source follower amplifier 419, and is output to the vertical output line 422.

Figure 9A:
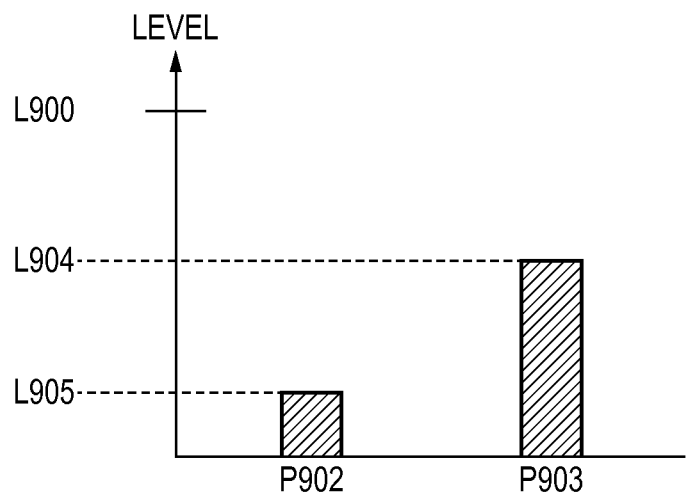
FIGS. 9A and 9B are graphs illustrating pixel signal levels and output selection according to the first embodiment.
Figure 9B:
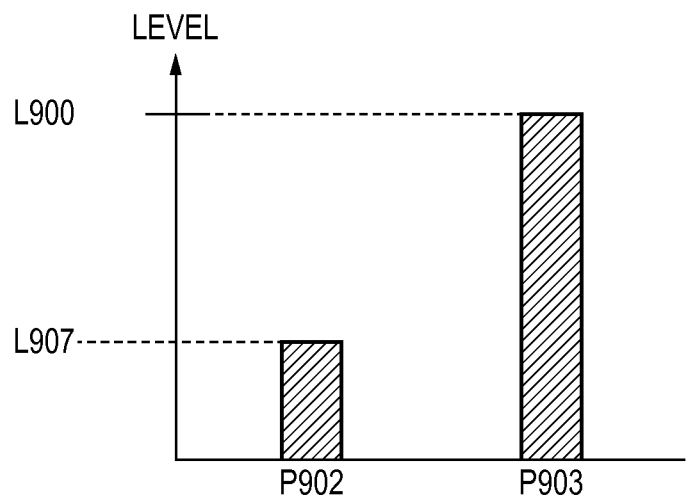

FIGS. 9A and 9B are graphs illustrating the levels of pixel signals of specific pixels and the output selection therefor according to the first embodiment, showing the levels of the pixel signals of specific pixels. L900 denotes the saturation level. FIG. 9A shows the output obtained by the driving of the CCD 409 side of the configuration described with reference to FIG. 8, or in other words, the output obtained by the driving with a short accumulation time. The output of a pixel P902 is a level L905, which is considerably small relative to the saturation level L900. The output of a pixel P903 is a level L904. In contrast, FIG. 9B shows the output obtained by the CCD 415 side of the configuration described with reference to FIG. 8, or in other words, the output obtained by the driving with a long accumulation time. The output of the pixel P902 is a level L907, and the output of the pixel P903 reaches the saturation level L900.

Based on this result, the CPU 50 selects, via the pixel output selection unit 73, the level L907, which is output by using the CCD 415, from the pixel P902 and selects the level L904, which is output by using the CCD 409, from the pixel P903. Note that the level conversion is performed as needed for each output in order to maintain the consistency of output. For example, it is assumed that the accumulation period of time for the signal of the CCD 415 is twice as long as that for the signal of the CCD 409. Under this condition, the CPU 50 applies a gain of ½ to the output of the CCD 415 via the image processing unit 72. This output selection for outputting an appropriate level is performed for all pixels.

Figure 10:
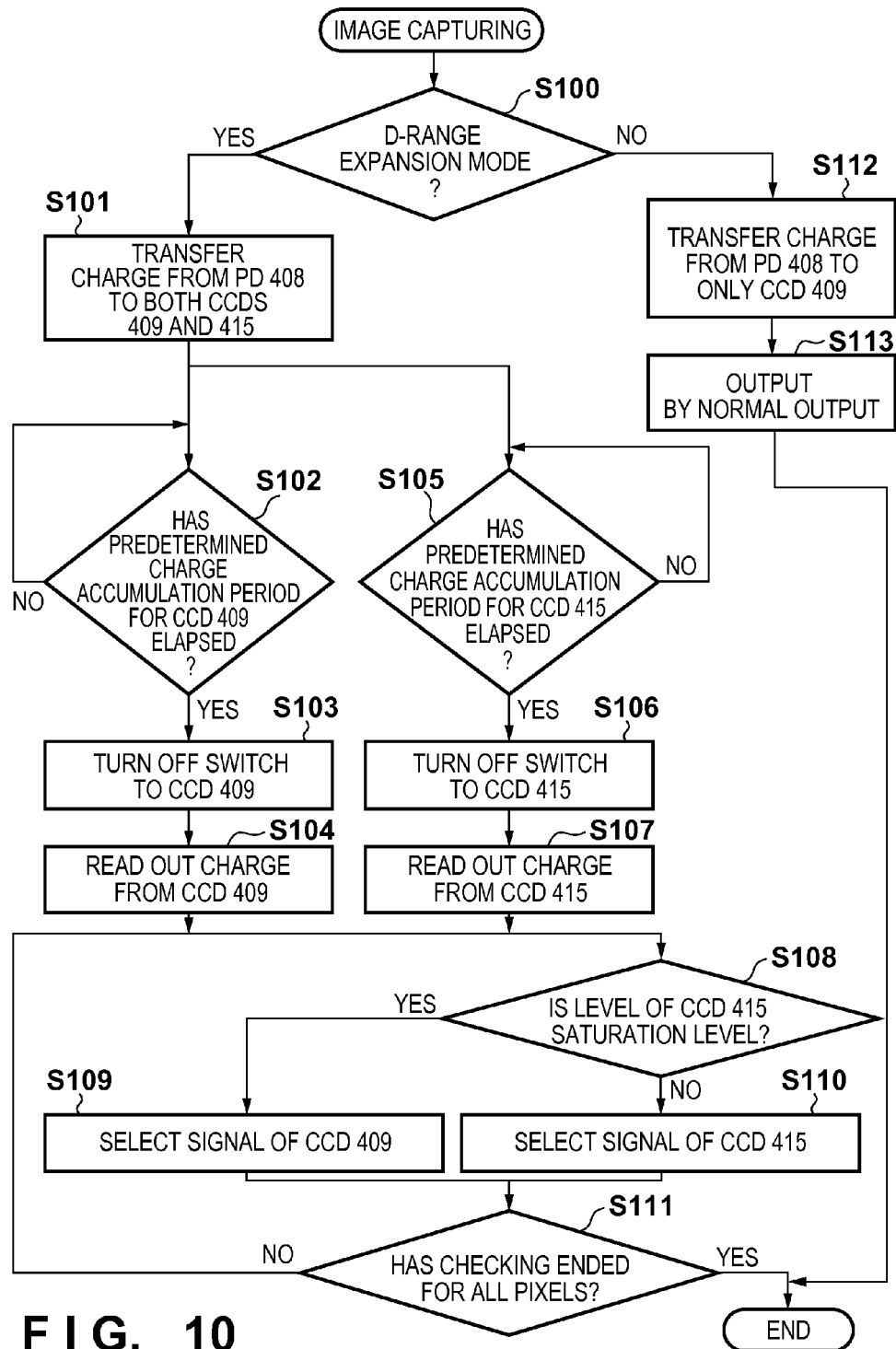
FIG. 10 is a flowchart illustrating readout control of the image sensor according to the first embodiment.

FIG. 10 is a flowchart illustrating readout control of the image sensor 1400 according to the first embodiment. When the image capturing starts, the setting is checked to determine whether the mode is to be set to the dynamic range (D-range) expansion mode (S100). If it is not to be set to the D-range expansion mode, the charge is transferred from the PD 408 only to the CCD 409 (S112), and is independently output from all pixels by normal output (S113), as described with reference to FIGS. 5 and 6.

If it is to be set to the D-range expansion mode, the CPU 50 controls to lower the potentials of the CCDs 409 and 415 via the TG 1800 and the vertical scanning circuit 202 so that the charges are transferred to the CCD 409 and the CCD 415 (S101). After a predetermined charge accumulation period for the CCD 409 has elapsed (YES at S102), the CPU 50 controls to restore the potential of the CCD 409 via the TG 1800 and the vertical scanning circuit 202 (S103). Then, the CPU 50 controls to read out the accumulated charge from the CCD 409 via the TG 1800 and the vertical scanning circuit 202 (S104).

After the accumulation period for the other CCD 415 has elapsed (YES at S105), the CPU 50 controls to restore the potential of the CCD 415 via the TG 1800 and the vertical scanning circuit 202 (S106). Then, the CPU 50 controls to read out the accumulated charge from the CCD 415 via the TG 1800 and the vertical scanning circuit 202 (S107).

When the signals read out from the CCDs 409 and 415 are all present in the memory of the CPU 50, it is checked whether the output of the CCD 415 for a single pixel read out with a longer time is the saturation level (S108). If it is saturated, the output of the CCD 409 is selected (S109). If it is not saturated, the output of the CCD 415 is selected (S110). The level comparison and the output selection at this time are performed by the pixel output selection unit 73 under control of the CPU 50.

It is checked whether the above-described checking of the pixel output has ended for all pixels (S111). If it has not ended, the process returns to S108, at which the checking is performed for the next pixel. When the checking has ended for all pixels, the readout ends.

As described above, according to the first embodiment, a plurality of CCD portions are connected to a PD, and outputs with different accumulation periods of time are respectively obtained by the CCD portions. Thereby, it is possible to generate an image of an appropriate output level in each pixel.

Second Embodiment

Next, a second embodiment of the present invention will be described. Note that the configurations of the image capturing apparatus and the image sensor according to the second embodiment are the same as those described with reference to FIGS. 1 to 4B in the first embodiment described above, and therefore, the description thereof shall be omitted here. In the second embodiment, each of the CCDs 409 and 415 is driven at the same timing such that the charge accumulation period is the same, and whether to add or independently output the two outputs in a later stage is selected.

Figure 11:
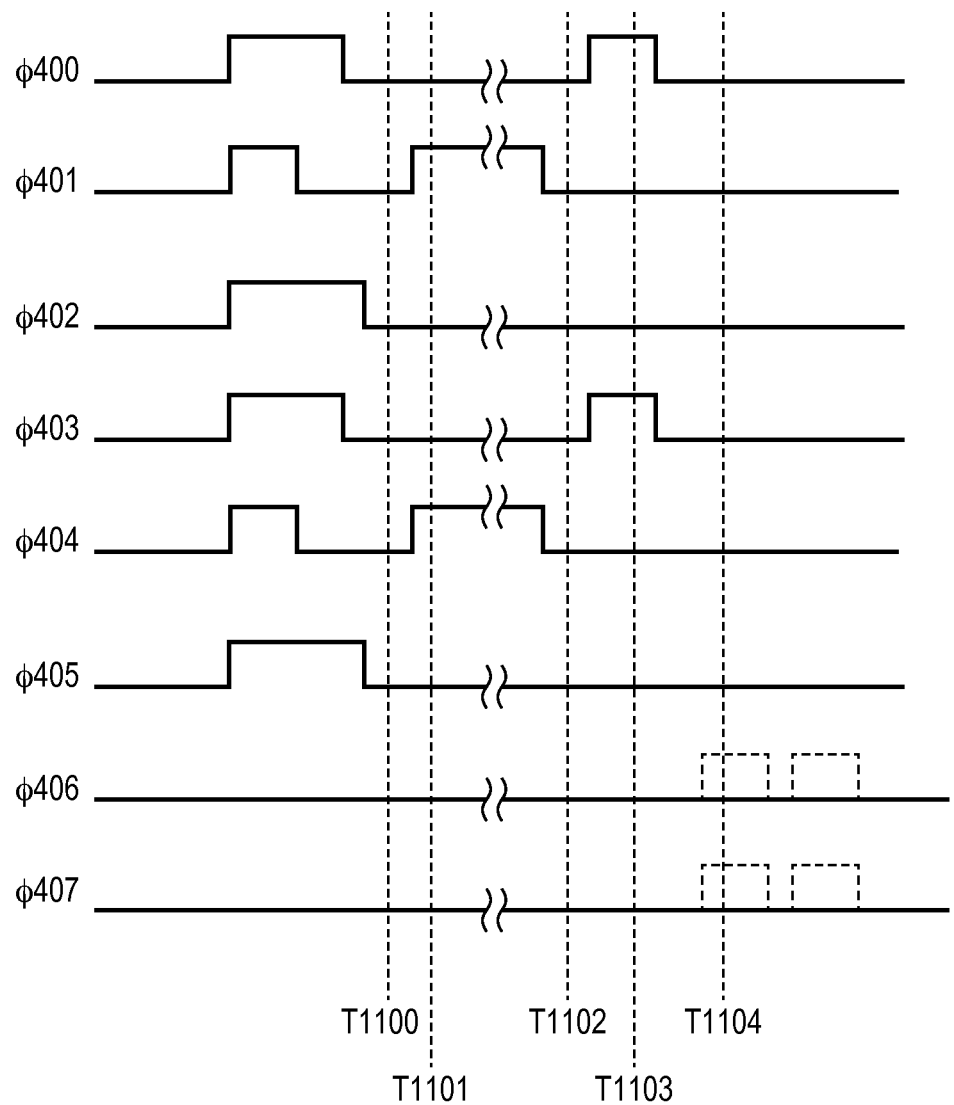
FIG. 11 is a timing chart showing a pixel driving pattern according to a second embodiment.
Figure 12:
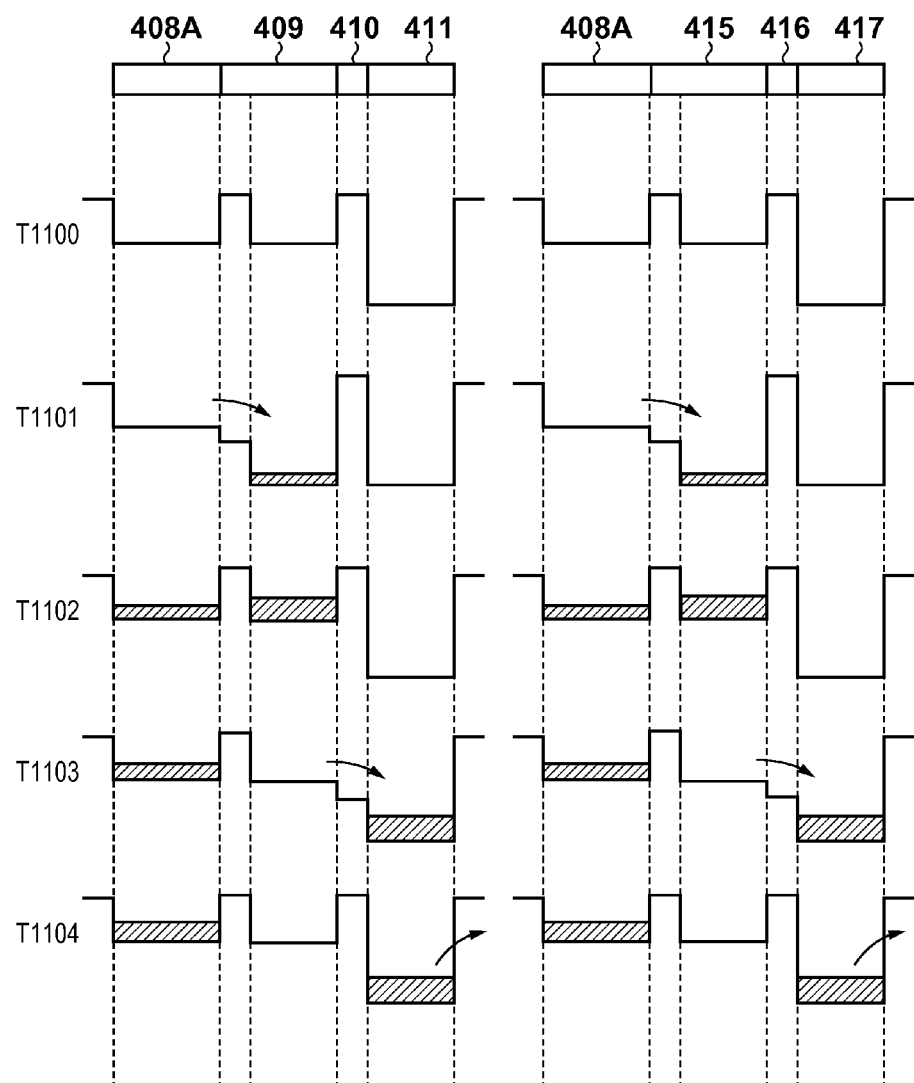
FIG. 12 is a potential transition diagram according to the second embodiment.

With reference to FIGS. 11 and 12, a description will be given of charge transfer by a readout scheme according to the second embodiment. FIG. 11 shows a timing chart of control signals according to the second embodiment. FIG. 12 shows a potential transition diagram according to the second embodiment. Note that the control of the control signals φ400 to φ407 shown in FIG. 11 is performed by the CPU 50 via the TG 1800 and the vertical scanning circuit 202.

First, as with the first embodiment, the same operations as those performed at timings T500 to T503 in FIGS. 5 and 6 are performed as the reset operations, and therefore, the detailed description thereof shall be omitted here. However, the readout scheme according to the second embodiment uses both of the CCDs 409 and 415, and therefore, the control signals φ403 to φ405 are controlled in the same manner as the control signals φ400 to φ402. After resetting, at timing T1100, all the excess charges in the charge holding unit 408A, the CCD 409, the CCD 415, the FD 411, and the FD 417 have been reset (T1100 in FIG. 12).

Between timings T1100 and T1101, the accumulation of charge is started. Then, the CCD control signals φ401 and φ404 are set to HIGH, and thereby, the charge generated in the PD 408 during the charge accumulation period is transferred to each of the CCD 409 and the CCD 415 via the charge holding unit 408A at timing T1101 (T1101 in FIG. 12).

After a predetermined charge accumulation period has elapsed since the accumulation of charge was started, the CCD control signals φ401 and φ404 are set to LOW immediately before timing T1102, thereby raising the potentials of the CCDs 409 and 415 at timing T1102 (T1102 in FIG. 12).

Between timings T1102 and T1103, the transfer control signals φ400 and φ403 are set to HIGH. Thereby, at timing T1103, the charge that has been held in the CCD 409 is transferred to the FD 411, and the charge that has been held in the CCD 415 is transferred to the FD 417 (T1103 in FIG. 12).

Between timings T1103 and T1104, the transfer control signals φ400 and φ403 are set to LOW. Thereby, at timing T1104, the charges in all pixels have been transferred to the FD 411 and the FD 417 (T1104 in FIG. 12). After timing T1104, each of the row selection control signals φ406 and φ407 is set to HIGH on a row-by-row basis, and thereby, the voltage of the FD 411 in which the charge is held is amplified by the source follower amplifier 413, and is output to the vertical output line 421. Additionally, the voltage of the FD 417 is amplified by the source follower amplifier 419, and is output to the vertical output line 422.

Figure 13A:
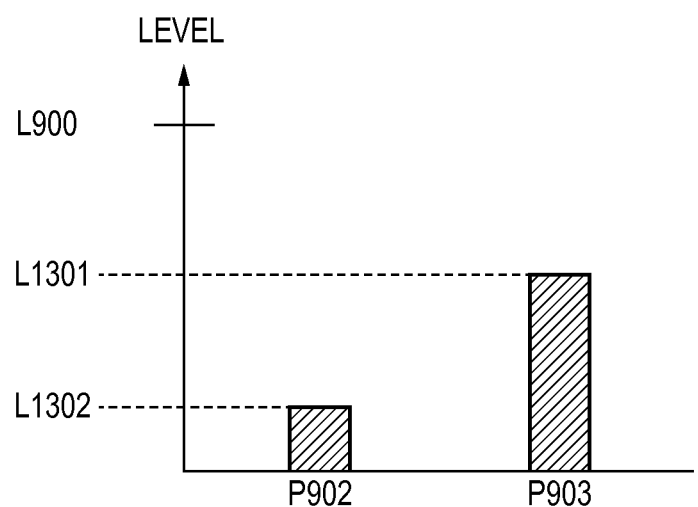
FIGS. 13A and 13B are graphs showing pixel signal levels and output selection according to the second embodiment.
Figure 13B:
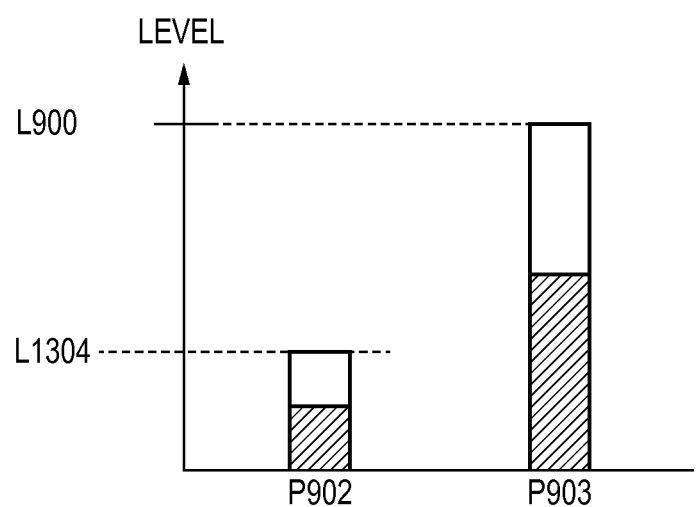

FIGS. 13A and 13B are graphs illustrating the levels of pixel signals of specific pixels and the output selection therefor according to the second embodiment. As with FIGS. 9A and 9B, the levels of the pixel signals of specific pixels are shown. L900 is the saturation level. FIG. 13A shows the output of a single CCD. Here, for example, the output of the CCD 409 is shown. The output of the pixel P902 is a level L1302, which is considerably small relative to the saturation level L900. The output of the pixel P903 is a level L1301. FIG. 13B shows the levels when the outputs of the two CCDs 409 and 415 are added. The added output of the pixel P902 is a level L1304. On the other hand, the added output of the pixel P903 reaches the saturation level L900.

Based on this result, the CPU 50 selects the level L1304, which is obtained by adding the outputs of the CCD 409 and the CCD 415, as the output of the pixel P902, and selects the level L1301, which is the output of the CCD 409, as the output of the pixel P903, via the pixel addition unit 74. Note that the level conversion is performed as needed for each output in order to maintain the consistency of output. For example, it is assumed that the level obtained when addition is performed is about twice the level obtained when addition is not performed. Under this condition, the CPU 50 applies, via the image processing unit 72, a gain of ½ times to the output resulting from addition.

Figure 14:
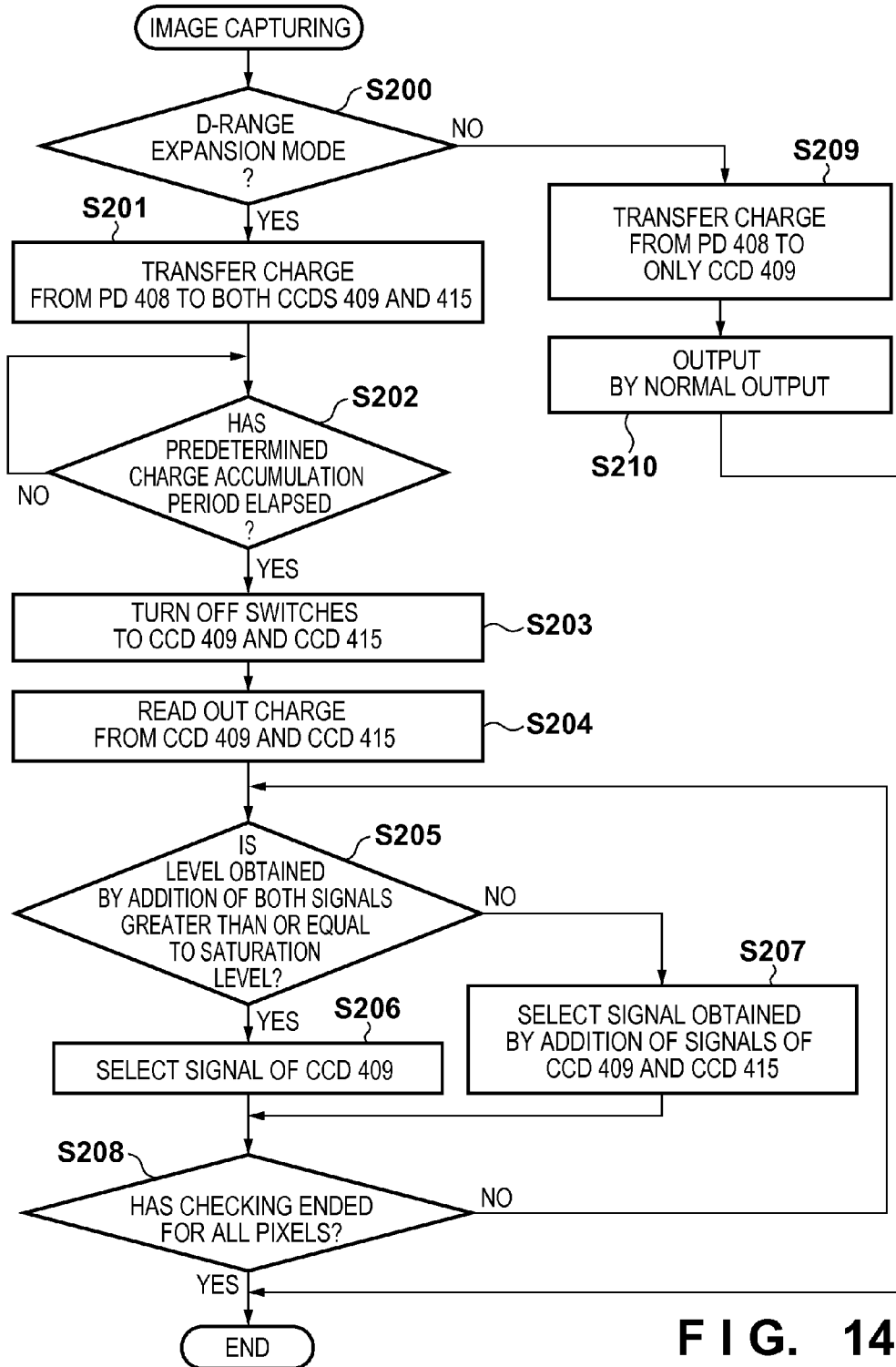
FIG. 14 is a flowchart illustrating readout control of an image sensor according to the second embodiment.

FIG. 14 is a flowchart illustrating readout control of the image sensor 1400 according to the second embodiment. When the image capturing starts, the setting is checked to determine whether the mode is to be set to the D-range expansion mode (S200). If it is not to be set to the D-range expansion mode, the charge is transferred from the PD 408 only to the CCD 409 (S209), and is independently output from all pixels by normal output (S210), as described with reference to FIGS. 5 and 6 in the first embodiment.

If it is to be set to the D-range expansion mode, the CPU 50 controls to lower the potentials of the CCDs 409 and 415 via the TG 1800 and the vertical scanning circuit 202 so that the charges are transferred to the CCDs 409 and 415 (S201). Then, after a predetermined charge accumulation period has elapsed (YES at S202), the CPU 50 controls to restore the potentials of the CCDs 409 and 415 via the TG 1800 and the vertical scanning circuit 202 (S203). Then, the CPU 50 controls to read out the accumulated charges from the CCDs 409 and 415 via the TG 1800 and the vertical scanning circuit 202 (S204).

When the data read out from the CCDs 409 and 415 is all present in the memory of the CPU 50, it is checked whether the level obtained when the two signals are added is saturated (S205). If it is not saturated, the result of adding the signals of the CCDs 409 and 415 is selected (S207). If it is saturated, the output of the CCD 409 is selected (S206). Note that the output obtained by averaging the levels of the CCDs 409 and 415 may be selected.

Then, it is checked whether the above-described checking of the pixel output has ended for all pixels (S208). If it has not ended, the process returns to S205, at which the checking is performed for the next pixel. When the checking has ended for all pixels, the readout ends.

As described above, according to the second embodiment, a plurality of CCD portions are connected to a PD, and the outputs of the CCD portions driven at at the same timing and having the same charge accumulation period are obtained. By selecting whether or not to add the outputs, it is possible to generate an image of an appropriate output level in each pixel.

Third Embodiment

Next, a third embodiment of the present invention will be described. Note that the configurations of the image capturing apparatus and the image sensor according to the third embodiment are different in the configuration of the image sensor 1400 from those described with reference to FIGS. 1 to 4B in the first embodiment described above. The rest of the configurations are the same, and therefore, the description thereof shall be omitted here. Additionally, in the third embodiment, as with the second embodiment, each of the CCDs 409 and 415 is driven at the same timing as shown in FIG. 11 such that the charge accumulation period is the same. Different gains are applied to the column amplifiers when the charge is readout from each of the CCDs 409 and 415.

Figure 15:
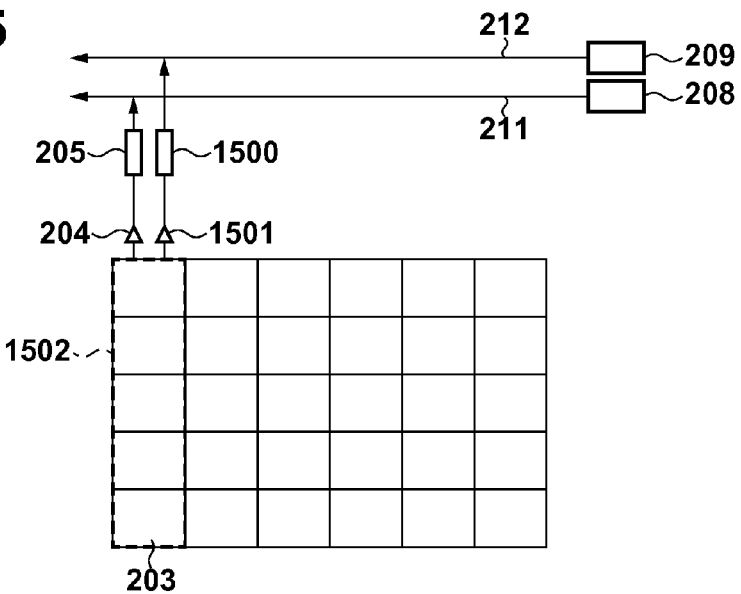
FIG. 15 is a block diagram showing a configuration of the image sensor according to a third embodiment.

FIG. 15 is a block diagram showing a configuration of an image sensor according to the third embodiment. Regarding the pixels, the column amplifiers 204, the column circuits 205 and the like, the column amplifier and the column circuit connected to the column 1502 of the pixel unit 206 included in the configuration of the image sensor 1400 shown in FIG. 3 are shown. Here, the column amplifier and the column circuit that are connected to the CCD 409 are denoted by 204 and 205, respectively, and the column amplifier and the column circuit that are connected to the CCD 415 are denoted by 1501 and 1500, respectively.

In the second embodiment described above, after the signals read out from the CCDs 409 and 415 have been output to the vertical output lines 421 and 422, the same gain is applied to the column amplifiers 204. In contrast, in the third embodiment, different gains are applied to the column amplifiers 204 and 1501.

Figure 16A:
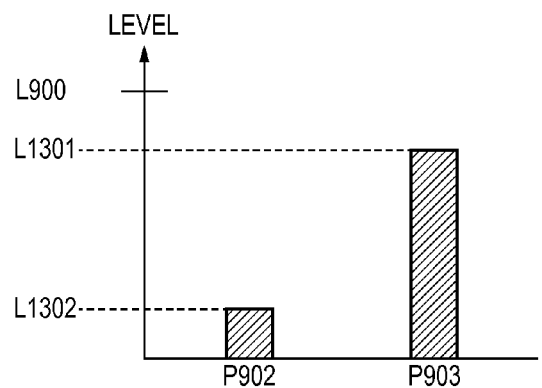
FIGS. 16A and 16B are graphs showing pixel signal levels and output selection according to the third embodiment.
Figure 16B:
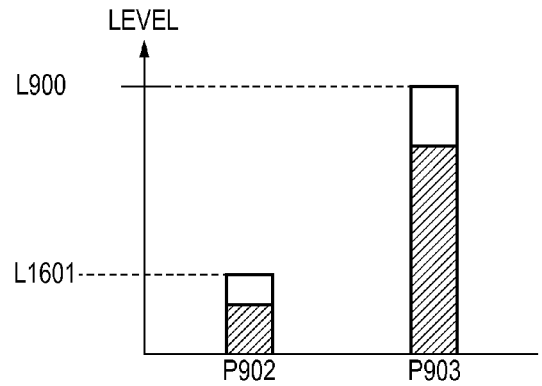

FIGS. 16A and 16B are graphs illustrating the levels of pixel signals of specific pixels and the output selection therefor according to the third embodiment. As with FIGS. 9A and 9B, the levels of pixel signals of specific pixels are shown. L900 is the saturation level. FIG. 16A shows the output of the CCD 409. The output levels L1301 and L1302 of the pixels P902 and P903 are the same as those shown in FIG. 13A. FIG. 16B shows the output of the CCD 415. Here, an example is shown in which the column amplifier 1501 connected to the CCD 415 has a larger gain than the column amplifier 204 connected to the CCD 409. This shows that the output level of the pixel P902 is L1601, and the output level of the pixel P903 is the saturation level L900.

Based on this result, the CPU 50 controls to select the output level L1601 of the CCD 415 as the output of the pixel P902 via the pixel output selection unit 73. As the output of the pixel P903, the CPU 50 controls to select the output level L1301 of the CCD 409. Note that the level conversion is performed as needed for each output in order to maintain the consistency of output. For example, the CPU 50 multiplies the output level of the CCD 415 by a gain ratio G2/G1 of the column amplifiers in the image processing unit 72, for example, when G1 represents the gain of the column amplifier 1501 and G2 represent the gain of the column amplifier 204, thus maintaining the consistency.

Figure 17:
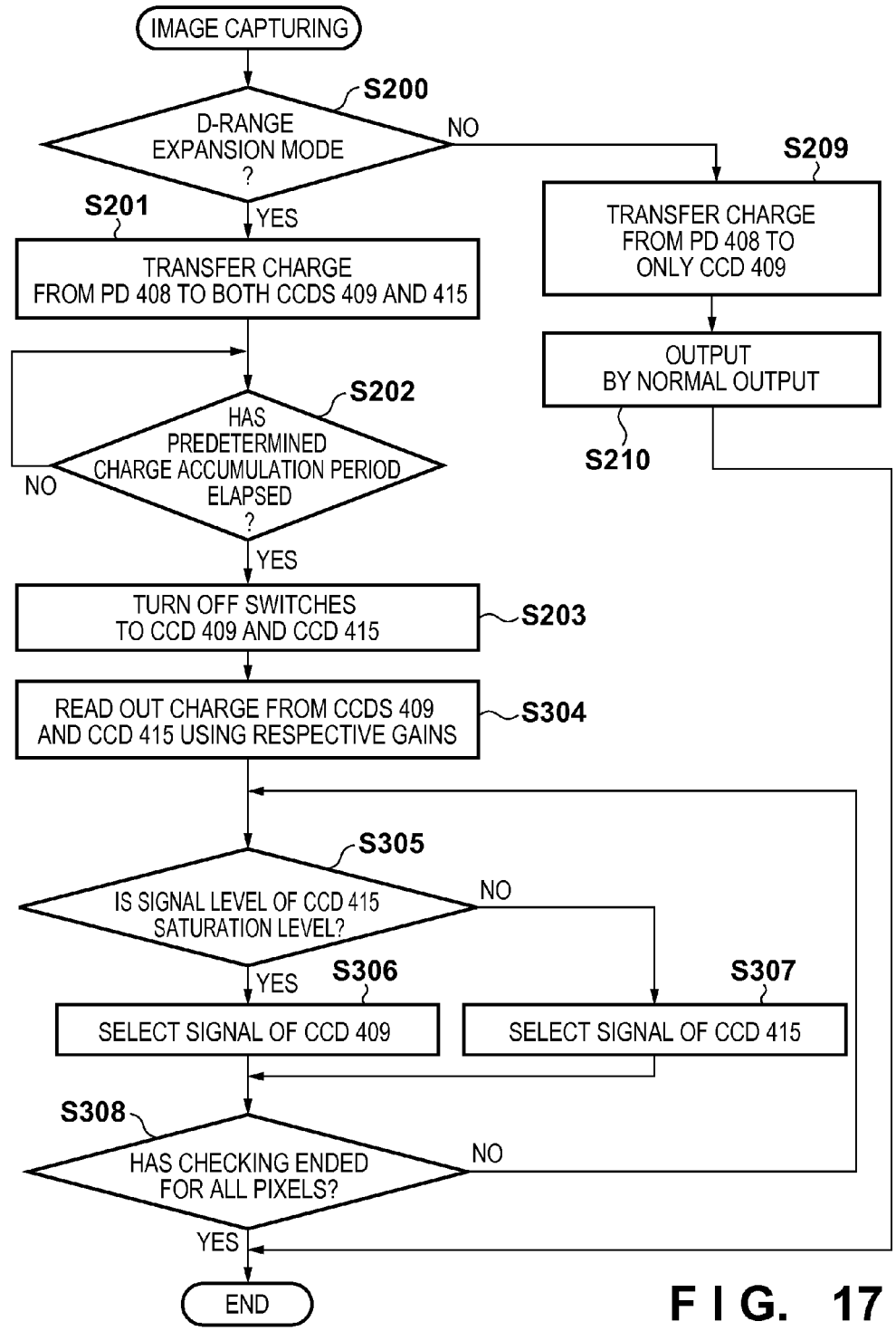
FIG. 17 is a flowchart illustrating readout control of an image sensor according to the third embodiment.

FIG. 17 is a flowchart illustrating readout control of the image sensor 1400 according to the third embodiment. Note that the processing of S200 to S203, S209 and S210 are the same as the processing described with reference to FIG. 14 in the second embodiment, and therefore, the description thereof shall be omitted here.

After a predetermined charge accumulation period of time has elapsed, the CPU 50 controls to read out the accumulated charges from the CCD 409 and the CCD 415 via the TG 1800 and the vertical scanning circuit 202. At this time, the gain of the column amplifier 1501 connected to the CCD 415 is larger than the gain of the column amplifier 204 connected to the CCD 409 (S304).

When the data read out from the CCD 409 and the CCD 415 is all present in the memory of the CPU 50, it is checked whether the level of the signal read out from the CCD 415 is saturated (S305). If it is not saturated, the output of the CCD 415 to which the column amplifier 1501 having a larger gain is connected is selected (S307). If it is saturated, the output of the CCD 409 is selected (S306).

Then, it is checked whether the above-described checking of the pixel output has ended for all pixels (S308). If it has not ended, the process returns to S305, at which the checking is performed for the next pixel. When the checking has ended for all pixels, the readout ends.

As described above, according to the third embodiment, a plurality of CCD portions are connected to a PD, different gains are applied by the column amplifiers to the outputs of the CCD portions driven at the same timing and having the same charge accumulation period, and one of the outputs is selected. This makes it possible to generate an image of an appropriate output level in each pixel.

Fourth Embodiment

Next, a fourth embodiment of the present invention will be described. Note that the configurations of the image capturing apparatus and the image sensor according to the fourth embodiment are the same as those described with reference to FIGS. 1 to 4B in the first embodiment described above, and therefore, the description thereof shall be omitted here. In the fourth embodiment, the CCDs 409 and 415 are driven at different timings for the same period, and whether to add the outputs of the CCDs 409 and 415 or to select and output a portion thereof is selected.

Figure 18:
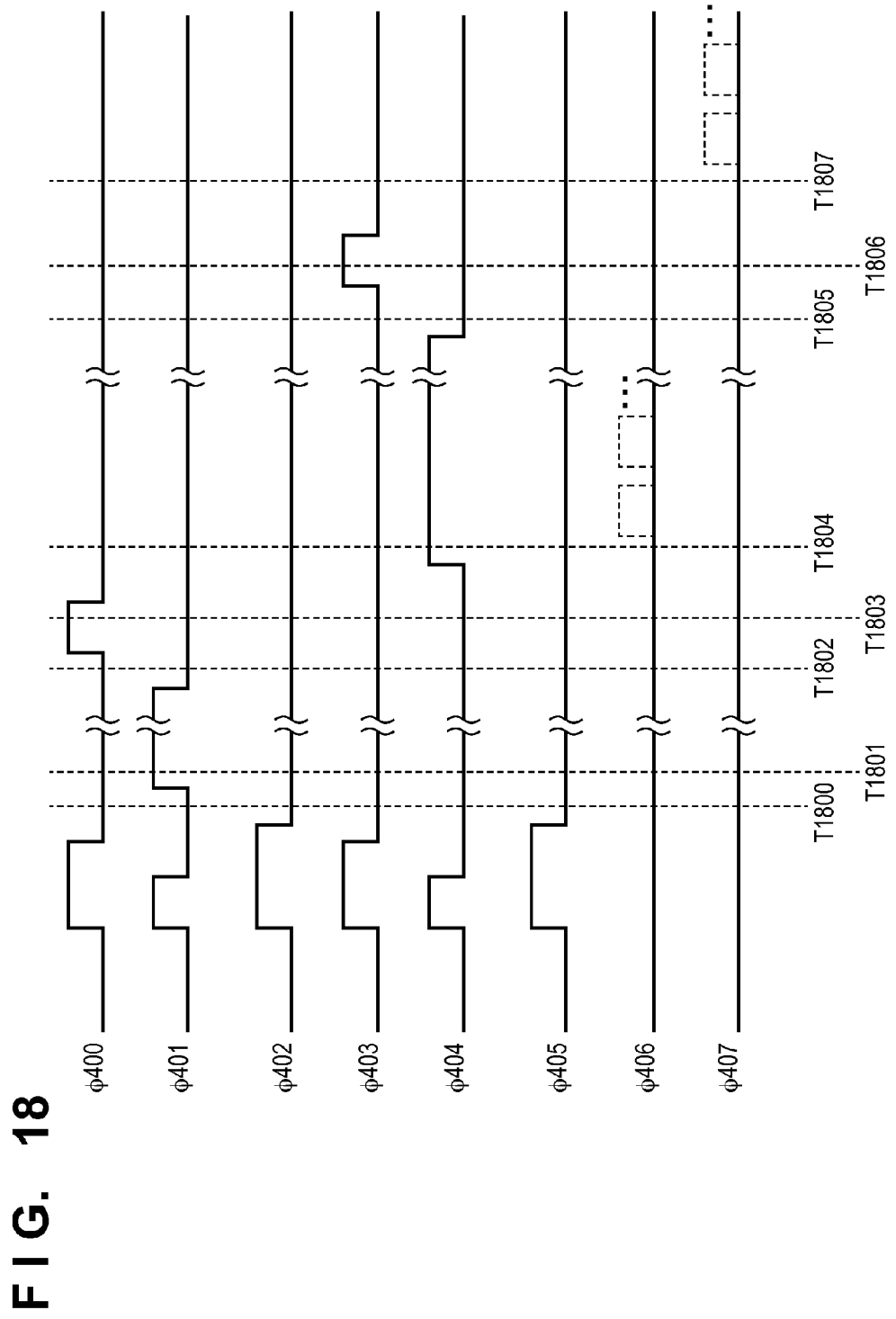
FIG. 18 is a timing chart showing a pixel driving pattern according to a fourth embodiment.
Figure 19:
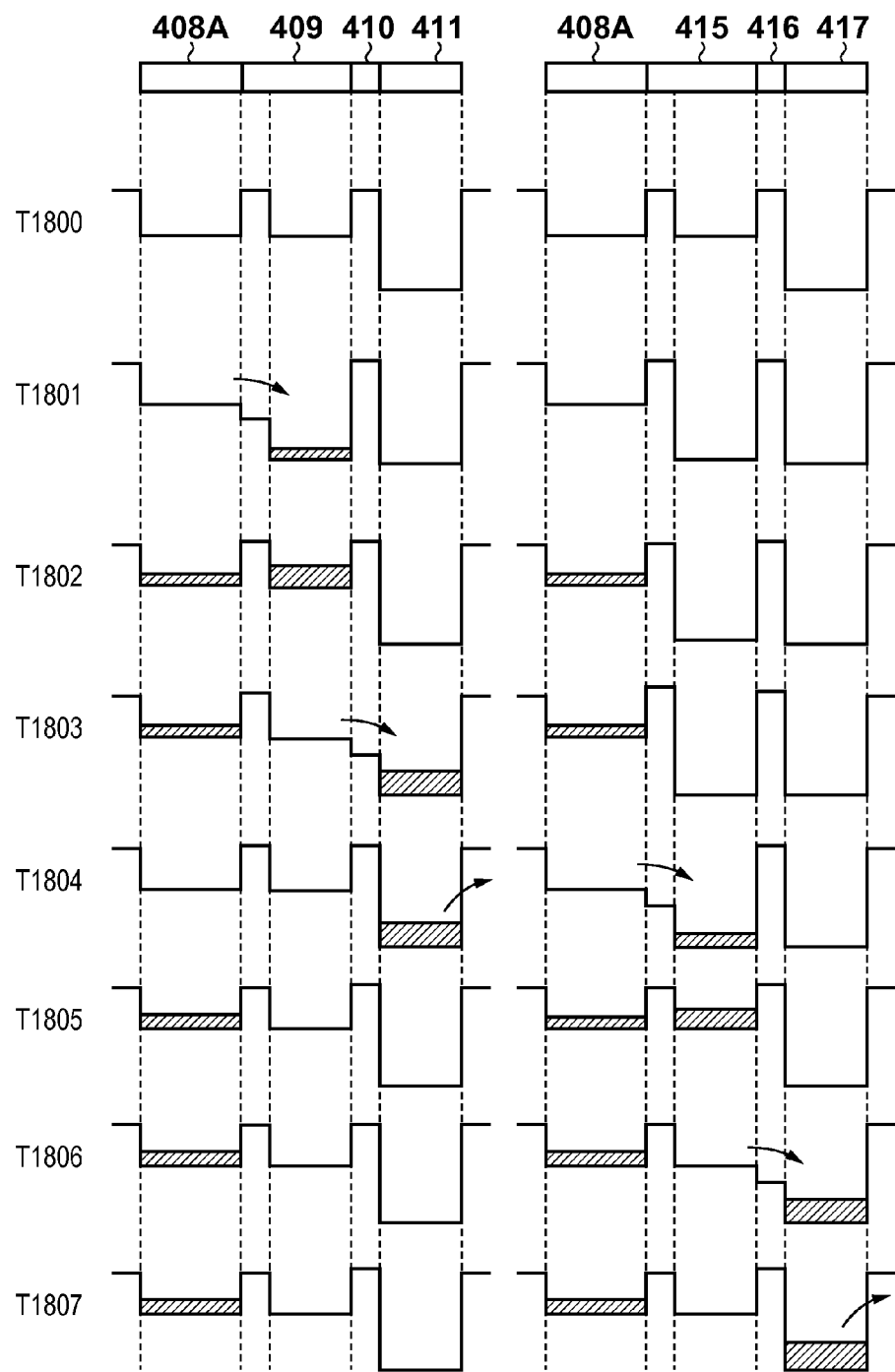
FIG. 19 is a potential transition diagram according to the fourth embodiment.

With reference to FIGS. 18 and 19, a description will be given of charge transfer by a readout scheme according to the fourth embodiment. FIG. 18 shows a timing chart of control signals according to the fourth embodiment. FIG. 19 shows a potential transition diagram according to the fourth embodiment. Note that the control of the control signals φ400 to φ407 shown in FIG. 18 is performed by the CPU 50 via the TG 1800 and the vertical scanning circuit 202.

First, as with the first embodiment, the same operations performed at timings T500 to T503 shown in FIGS. 5 and 6 are performed as the reset operations, and therefore, the detailed description thereof shall be omitted here. However, the readout scheme of the fourth embodiment uses both of the CCDs 409 and 415, and therefore, the control signals φ403 to φ405 are controlled in the same manner as the control signals φ400 to φ402. After resetting, all the excess charges in the charge holding unit 408A, the CCD 409, the CCD 415, the FD 411, and the FD 417 have been reset at timing T1800 (T1800 in FIG. 19).

Between timings T1800 and T1801, the accumulation of charge is started. Then, the CCD control signal φ401 is set to HIGH, and thereby, the charge generated in the PD 408 during the charge accumulation period is transferred to the CCD 409 via the charge holding unit 408A at timing T1801 (T1801 in FIG. 19).

After a predetermined charge accumulation period has elapsed since the accumulation of charge was started, the CCD control signal φ401 is set to LOW immediately before timing T1802, and thereby, the potential of the CCD 409 is raised at timing T1802 (T1802 in FIG. 19).

Between timings T1802 and T1803, the transfer control signal φ400 is set to HIGH. Thereby, at timing T1803, the charge that has been held in the CCD 409 is transferred to the FD 411 (T1803 in FIG. 19).

Between timings T1803 and 1804, the transfer control signal φ400 is set to LOW, and thereafter, the CCD control signal φ404 is set to HIGH. Thereby, at timing T1804, the charges in all pixels have been transferred to the FDs 411. After timing T1804, the row selection control signal φ406 is set to HIGH on a row-by-row basis, and thereby, the voltage of the FD 411 in which the charge is held is amplified by the source follower amplifier 413, and is output to the vertical output line 421. Additionally, at T1804, the potential of the CCD 415 is lowered, and thereby, the charge generated in the PD 408 during the charge accumulation period is transferred to the CCD 415 (T1804 in FIG. 19).

After a predetermined charge accumulation period has elapsed since the accumulation of charge in the CCD 415 was started, the CCD control signal φ404 is set to LOW immediately before timing T1805 to raise the potential of the CCD 415 at timing T1805. Thereby, the transfer from the charge holding unit 408A to the CCD 415 is stopped (T1805 in FIG. 19).

Between timings T1805 and T1806, the transfer control signal φ403 is set to HIGH. Thereby, at timing T1806, the charge that has been held in the CCD 415 is transferred to the FD 417 (T1806 in FIG. 19).

Between timings T1806 and T1807, the transfer control signal φ403 is set to LOW. Thereby, at timing T1807, the charges in all pixels have been transferred to the FDs 417 (T1807 in FIG. 19). After timing T1807, the row selection control signal φ407 is set to HIGH on a row-by-row basis, and thereby, the voltage of the FD 417 in which the charge is held is amplified by the source follower amplifier 419, and is output to the vertical output line 422.

According to the fourth embodiment, whether to select one of the outputs or to add the outputs can be decided based on the result of continuous accumulation. For a pixel whose outputs from the CCDs 409 and 415 are both significantly lower than a predetermined level, the outputs may be added in the same manner as in the second embodiment. If the addition is not performed, either of the outputs may be selected. For example, when there are three CCDs and accumulation of charge is performed at separate timings, the output of the CCD for which the accumulation is performed second, which corresponds to the timing close to the middle of the charge accumulation, may always be selected, or the output of the CCD for which the accumulation is performed first, which corresponds to the timing close to the start of the charge accumulation, may always be selected. Alternatively, based on the information on camera shake, the output obtained during the accumulation period that is less affected by camera shake may be selected. Note that in the fourth embodiment as well, the level conversion is performed as needed for each output in order to maintain the consistency of output, as with the first to third embodiments.

Figure 20:
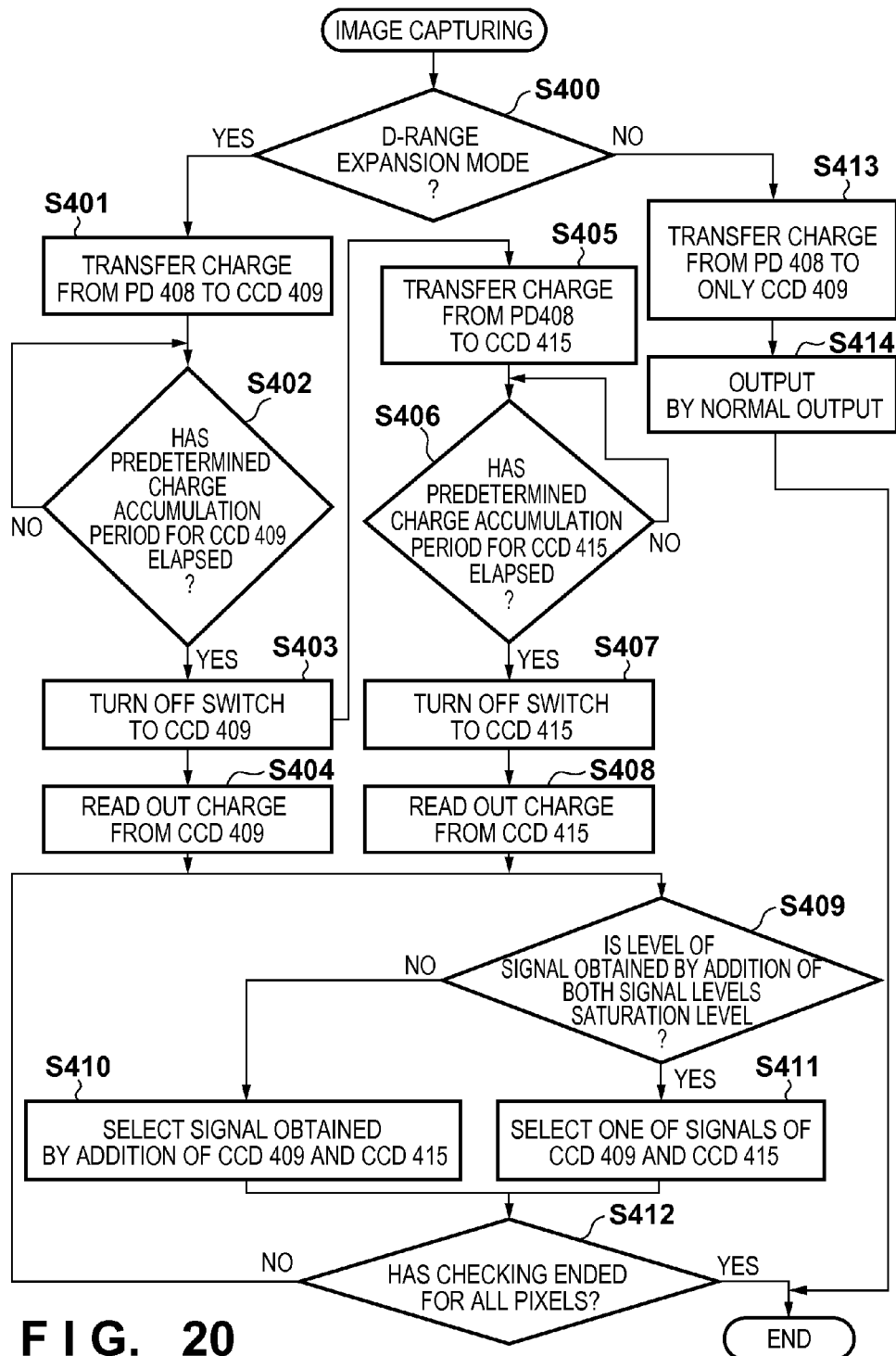
FIG. 20 is a flowchart illustrating readout control of an image sensor according to the fourth embodiment.

FIG. 20 is a flowchart illustrating readout control of the image sensor 1400 according to the fourth embodiment. When the image capturing starts, the setting is checked to determine whether the mode is to be set to the D-range expansion mode (S400). If it is not to be set to the D-range expansion mode, the charge is transferred from the PD 408 only to the CCD 409 (S413), and is independently output from all pixels by normal output (S414), as described with reference to FIGS. 5 and 6.

If it is to be set to the D-range expansion mode, the CPU 50 first controls to lower the potential of the CCD 409 via the TG 1800 and the vertical scanning circuit 202 such that the charge is transferred to the CCD 409 (S401). After a predetermined charge accumulation period for the CCD 409 has elapsed (YES at S402), the CPU 50 controls to restore the potential of the CCD 409 via the TG 1800 and the vertical scanning circuit 202 (S403). Then, the CPU 50 controls to read out the accumulated charge from the CCD 409 via the TG 1800 and the vertical scanning circuit 202 (S404).

In parallel with this, the CPU 50 controls to lower the potential of the CCD 415 via the TG 1800 and the vertical scanning circuit 202 such that charge is transferred to the CCD 415 (S405). After a predetermined charge accumulation period for the CCD 415 has elapsed (YES at S406), the CPU 50 controls to restore the potential of the CCD 415 via the TG 1800 and the vertical scanning circuit 202 (S407). Then, the CPU 50 controls to read out the accumulated charge from the CCD 415 via the TG 1800 and the vertical scanning circuit 202 (S408).

When the signals read out from the CCDs 409 and 415 are all present in the memory of the CPU 50, it is checked, for the signals of the same pixel, whether the level of a signal obtained by adding the two signals read out from the CCDs 409 and 415 is the saturation level (S409). If it is not saturated, the CPU 50 controls to add the two signals via the pixel addition unit 74 (S410). If it is saturated, the CPU 50 selects one of the outputs of the CCDs 409 and 415 (S411).

It is checked whether the above-described checking of the pixel output has ended for all pixels (S412). If it has not ended, the process returns to S409, at which the checking is performed for the next pixel. When the checking has ended for all pixels, the readout ends.

As described above, according to the fourth embodiment, a plurality of CCD portions are connected to a PD, and accumulation of charge is continuously performed at separate timings. Outputs for which the accumulation timings are different are obtained, and whether or not to add the outputs can be selected according to the levels of the obtained signals. Thereby, it is possible to generate an image of an appropriate output level in each pixel.

Fifth Embodiment

Next, a fifth embodiment of the present invention will be described. The image sensor 1400 according to the fifth embodiment is different from those of the first to fourth embodiments in that a single FD is connected to two CCDs, whereas an FD is connected to each of the two CCDs in the first to fourth embodiments. Note that the rest of the configuration of the image capturing apparatus are the same as those of the configuration described with reference to FIGS. 1 and 2 in the first embodiment, and therefore, the description thereof shall be omitted here.

Figure 21:
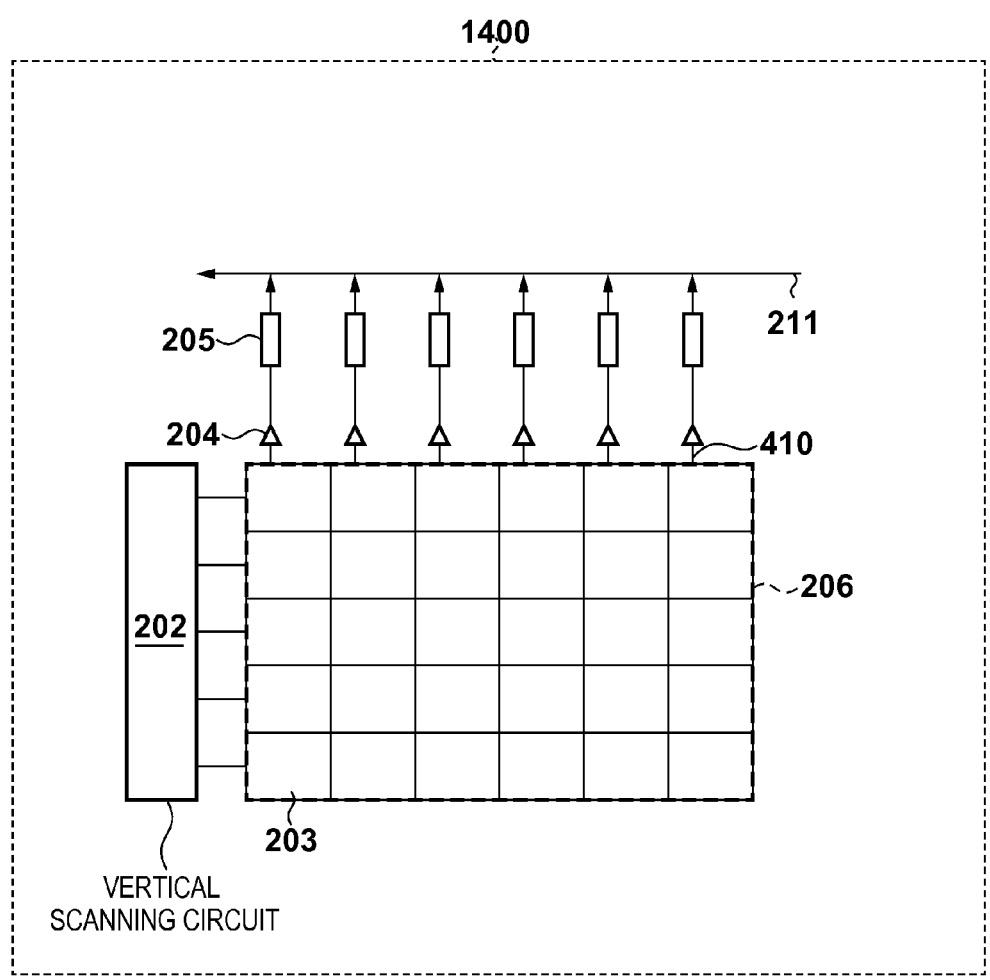
FIG. 21 is a block diagram showing a configuration of an image sensor according to a fifth embodiment.

FIG. 21 is a block diagram showing a configuration of the image sensor 1400 according to the fifth embodiment. The difference with the configuration shown in FIG. 3 is that two sets of column amplifiers and column circuits provided for each column are replaced by a single set of a column amplifier and a column circuit.

Figure 22:
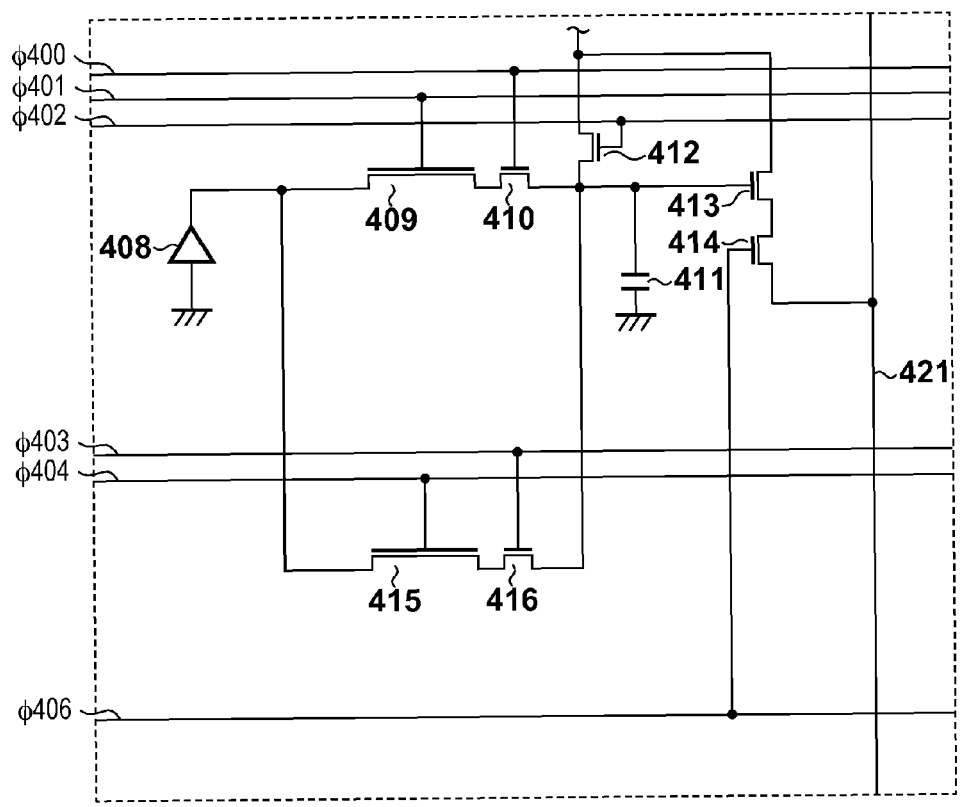
FIG. 22 is an equivalent circuit diagram of a pixel according to the fifth embodiment.

FIG. 22 is an equivalent circuit diagram of a pixel 203 according to the fifth embodiment. The difference with the configuration shown in FIGS. 4A and 4B is that the FD 411 connected to the CCD 409 is also used as the FD connected to a later stage of the CCD 415 via the transfer switch 416.

Figure 23:
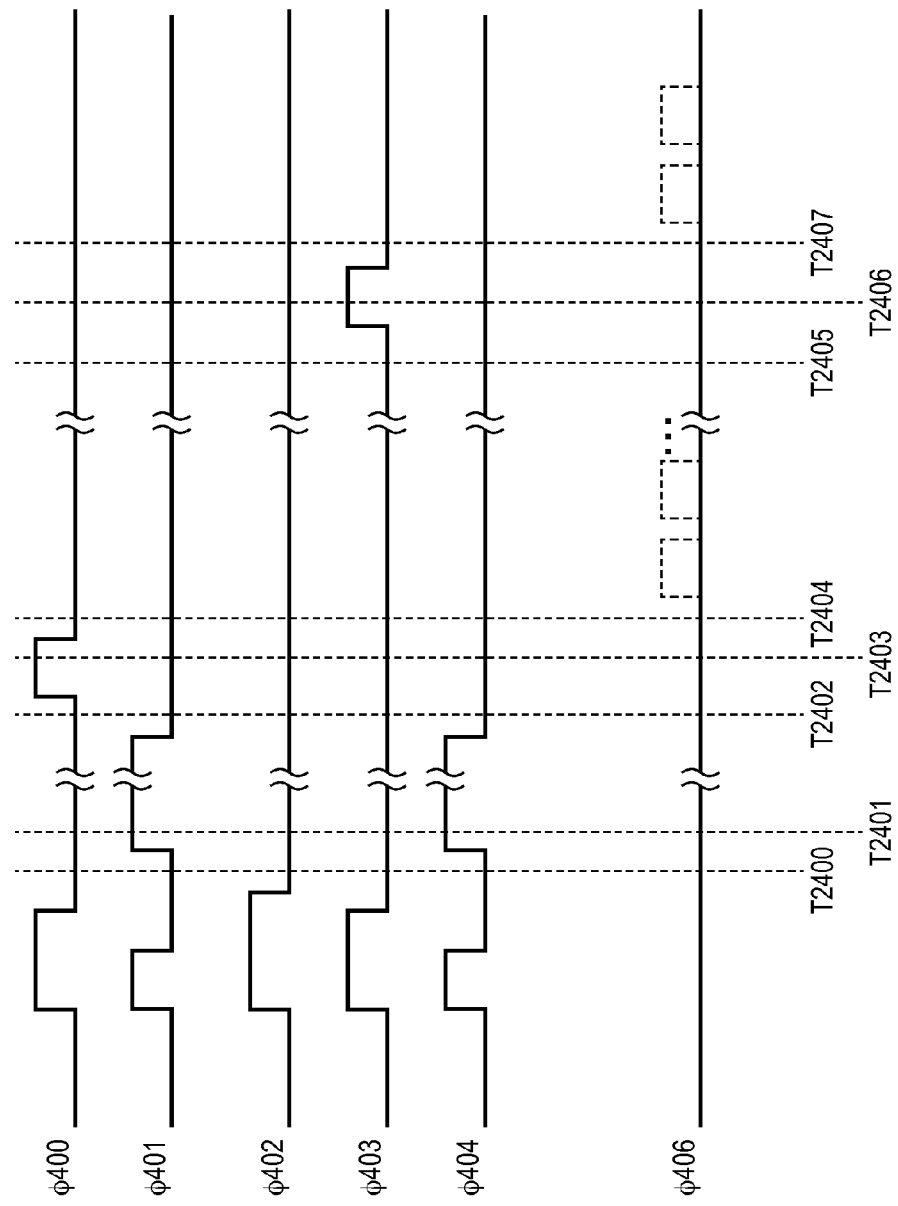
FIG. 23 is a timing chart showing a pixel driving pattern according to the fifth embodiment.
Figure 24:
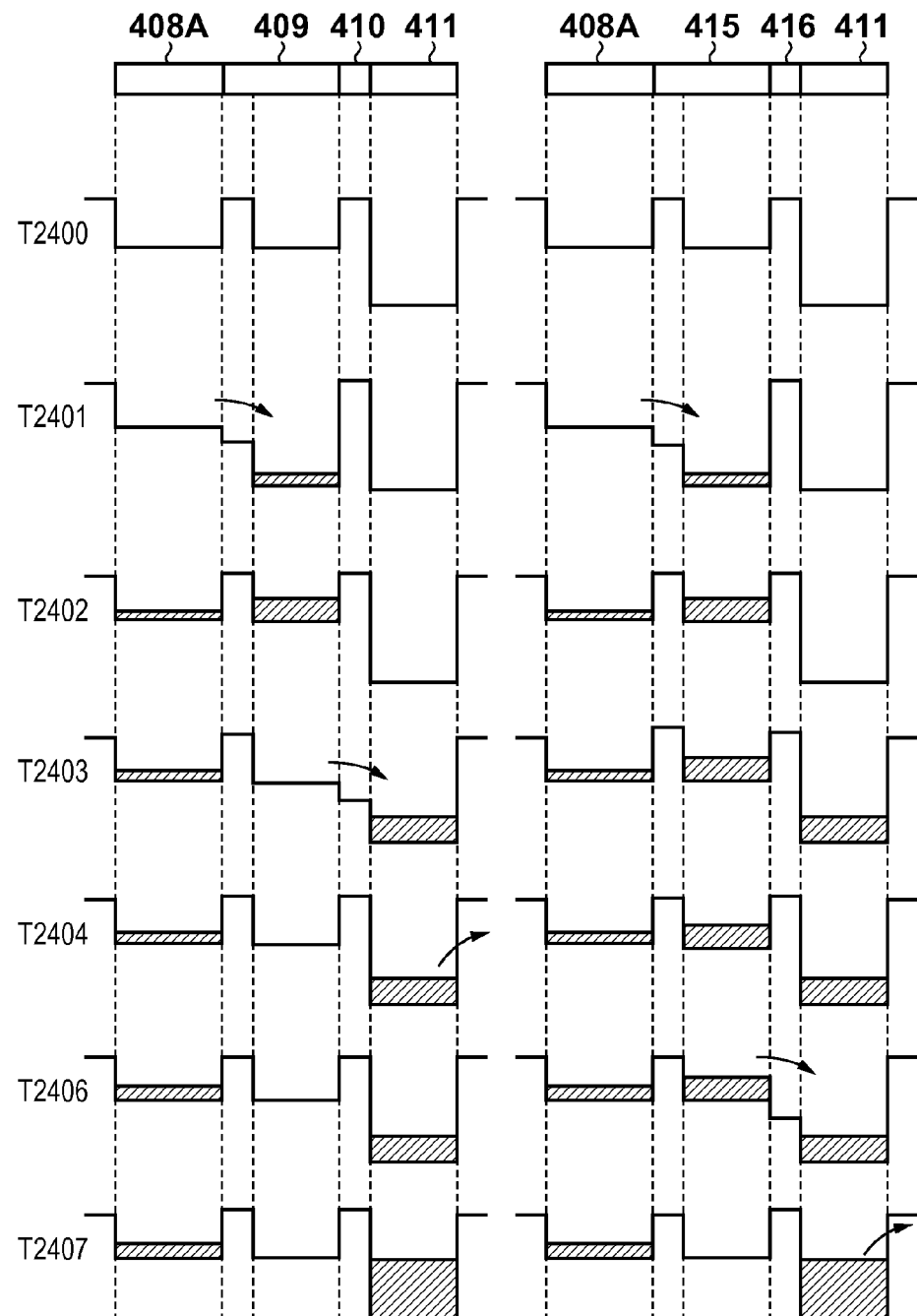
FIG. 24 is a potential transition diagram according to the fifth embodiment.

Next, with reference to FIGS. 23 and 24, a description will be given of charge transfer by a readout scheme that uses both of the CCDs 409 and 415 according to the fifth embodiment. FIG. 23 shows a timing chart of control signals according to the fifth embodiment. FIG. 24 shows a potential transition diagram according to the fifth embodiment. Note that the control of the control signals φ400 to φ406 shown in FIG. 23 is performed by the CPU 50 via the TG 1800 and the vertical scanning circuit 202.

First, as with the first embodiment, the same operations as those performed at timings T500 to T503 in FIGS. 5 and 6 are performed as the reset operations, and therefore, the detailed description thereof shall be omitted here. However, the readout scheme according to the fifth embodiment uses both of the CCDs 409 and 415, and therefore, the control signals φ403 and φ404 are controlled in the same manner as the control signals φ400 and φ401. After resetting, at timing T2400, all the excess charges in the charge holding unit 408A, the CCD 409, the CCD 415, the FD 411, and the FD 417 have been reset (T2400 in FIG. 24).

Between timings T2400 and T2401, the accumulation of charge is started. Then, the CCD control signal φ401 and the CCD control signal φ404 are set to HIGH. At timing T2401, the charge generated in the PD 408 during the charge accumulation period is transferred to each of the CCD 409 and the CCD 415 via the charge holding unit 408A (T2401 in FIG. 24).

After a predetermined charge accumulation period has elapsed since the accumulation of charge was started, the CCD control signal φ401 and the CCD control signal φ404 are set to LOW immediately before timing T2402. Thereby, at timing T2402, the potentials of the CCD 409 and the CCD 415 are raised (T2402 in FIG. 24).

Between timings T2402 and T2403, the transfer control signal φ400 is set to HIGH. Thereby, at timing T2403, the charge that has been held in the CCD 409 is transferred to the FD 411 (T2403 in FIG. 24).

Thereafter, between timings T2403 and T2404, the transfer control signal φ400 is set to LOW. Thereby, at timing T2404, the charges in all pixels have been transferred to the FDs 411. After timing T2404, the row selection control signal φ406 is set to HIGH on a row-by-row basis, and thereby, the voltage of the FD 411 in which the charge is held is amplified by the source follower amplifier 413, and is output to the vertical output line 421 (T2404 in FIG. 24). At timing T2405, the transfer to the vertical line of the signals corresponding to the charges transferred to the FD 411 ends for all rows.

Between timings T2405 and T2406, the transfer control signal φ403 is set to HIGH. Thereby, at timing T2406, the charge that has been held in the CCD 409 is transferred to the FD 411 so as to be added to the charge that was originally transferred from the CCD 409 (T2406 in FIG. 24).

Thereafter, between timings T2406 and T2407, the transfer control signal φ403 is set to LOW. Thereby, at timing T2407, the charges in all pixels have been transferred to the FDs 411. After timing T2407, the row selection control signal φ406 is set to HIGH on a row-by-row basis, and thereby, the voltage of the FD 411 in which the charge is held is amplified by the source follower amplifier 419, and is output to the vertical output line 421 (T2407 in FIG. 24). Note that in the fifth embodiment as well, the level conversion is performed as needed for each output in order to maintain the consistency of output, as with the first to fourth embodiments.

Figure 25:
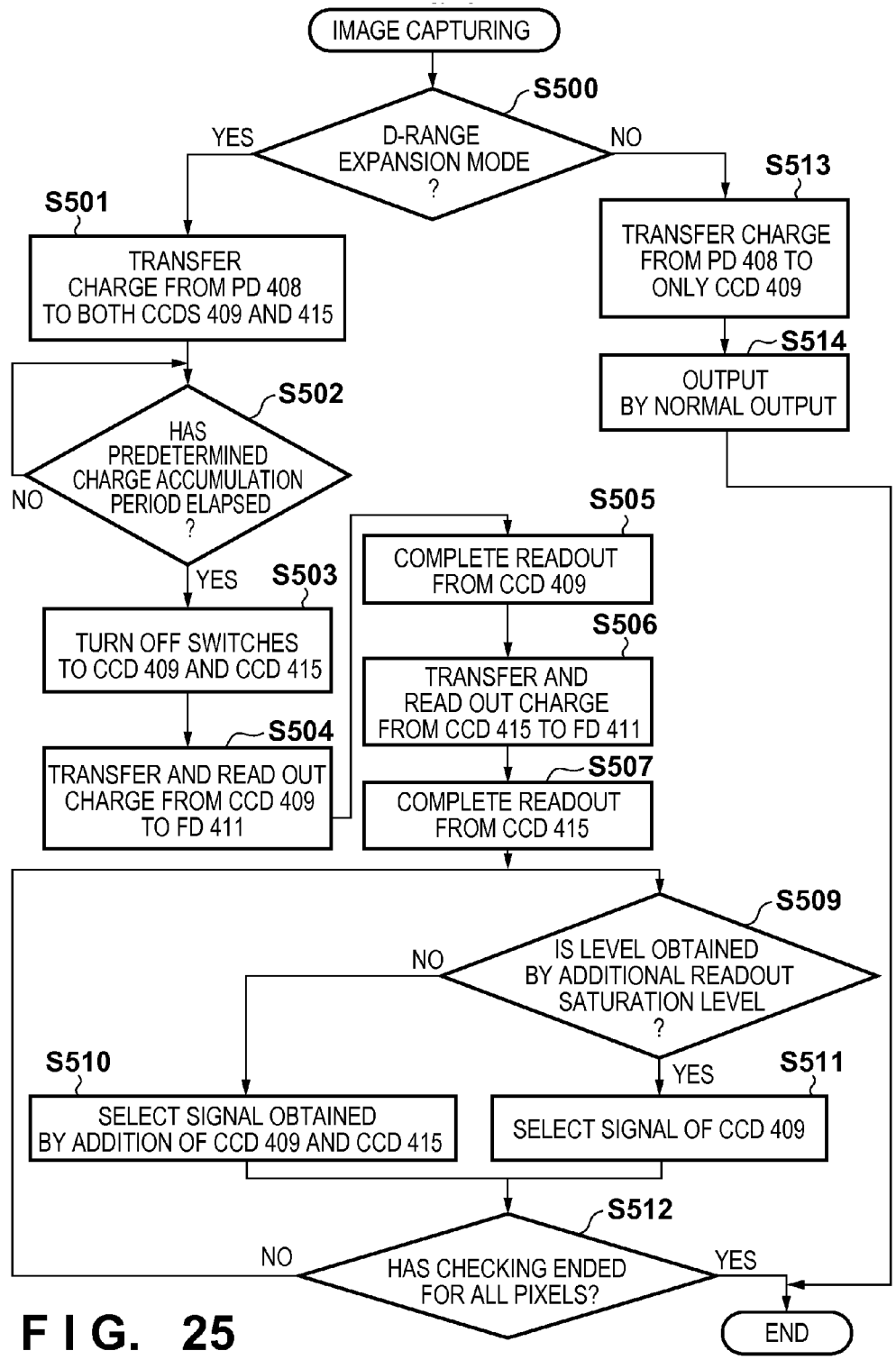
FIG. 25 is a flowchart illustrating readout control of an image sensor according to the fifth embodiment.

FIG. 25 is a flowchart illustrating readout control of the image sensor 1400 according to the fifth embodiment. When the image capturing starts, the setting is checked to determine whether the mode is to be set to the D-range expansion mode (S500). If it is not to be set to the D-range expansion mode, the charge is transferred from the PD 408 only to the CCD 409 (S513), and is independently output from all pixels by normal output (S514), as described with reference to FIGS. 5 and 6.

If it is to be set to the D-range expansion mode, the CPU 50 controls to lower the potentials of the CCDs 409 and 415 via the TG 1800 and the vertical scanning circuit 202 so as to transfer the signals to the two CCDs 409 and 415 such that the charges are transferred to the CCD 409 and the CCD 415 (S501). Then, after a predetermined charge accumulation period has elapsed (YES at S502), the CPU 50 controls to restore the potentials of the CCDs 409 and 415 via the TG 1800 and the vertical scanning circuit 202 (S503). Then, the CPU 50 controls to raise the potential of the transfer switch 410 via the TG 1800 and the vertical scanning circuit 202 to transfer only the charge accumulated in the CCD 409 to the FD 411, and to read out the charge in the CCD 409 via the vertical scanning circuit 202 (S504).

When the signal of the CCD 409 is read out from the FDs 411 of all rows to the vertical output line 421 (S505), the CPU 50 controls to transfer the charge accumulated in the CCD 415 to the FD 411 via the TG 1800 and the vertical scanning circuit 202. Thereby, the charge accumulated in the CCD 409 and the charge accumulated in the CCD 415 are added in the FD 411. Then, the CPU 50 controls to read out the charge accumulated in the FD 411 via the TG 1800 and the vertical scanning circuit 202 (S506).

When a single signal obtained by non-additional readout from the CCD 409 and a signal obtained by additional readout from the CCD 409 and the CCD 415 are all present in the memory of the CPU 50 (S507), it is checked whether the level of the signal obtained by additional readout is the saturation level (S509). If it is not saturated, the signal obtained by additional readout is selected (S510). If it is saturated, the signal read out from the CCD 409 is selected (S511). The above processes are repeated from S509 until it is determined in S512 that selection for all pixels are completed.

As described above, according to the fifth embodiment, a plurality of CCD portions are connected to a PD. When the CCDs are connected to a single FD, a single signal obtained by non-additional readout and a signal obtained by addition in the FD are sequentially read out, and one of the signals is selected according to the signal level. Accordingly, it is possible to obtain an added signal with a lower noise although it takes longer to perform readout compared with the configuration of the second embodiment since there is only one vertical line.

Sixth Embodiment

Next, a sixth embodiment according to the present invention will be described. According to the sixth embodiment, when a moving image is recorded in the example shown in the fifth embodiment in which pixels of a low signal level are added, whether to individually transfer signals read out in a plurality of CCDs without adding the signals, or to transfer signals after adding them is determined based on the signal of the previous frame. Note that the configurations of the image capturing apparatus and the image sensor are the same as those described with reference to FIGS. 1, 2, 21, and 22 in the first and fifth embodiments, and therefore, the description thereof shall be omitted here.

FIGS. 26A and 26B show frames and pixel levels at the time of recording a moving image according to the sixth embodiment. FIG. 26A shows a transition over time of frames read out in a predetermined cycle, and shows how signals are read out, for example, every 1/30 seconds, first from a frame f2600, and then from frames f2601, f2602, and f2603. FIG. 26B shows the transition of the signal levels of pixels pt2604, pt2605, pt2606, and pt2607 located at the same position of the respective frames at that time. In FIG. 26B, a level L900 is the saturation level, and a level L950 is a first threshold level used for a determination described below, and is, for example, a level that is one half the saturation level. A level L960 is a second threshold level used for a determination described below, and is, for example, a level that is about one half the first threshold level L950.

It is assumed that the signal of the pixel pt2604 is obtained by normal readout using a single CCD 409. In the example shown in FIG. 26B, the level is gradually lowered in the order of the level L2608 of the pixel pt2604, the level L2609 of the pixel pt2605, the level L2610 of the pixel pt2606, and so forth. Since the level of the pixel pt2607 is expected to be lower than L2610, a signal obtained by adding the charges in the two CCDs 409 and 415 is output. Accordingly, the level of the pixel pt2607 is a level L2612 as a result of the addition although it would have been L2611 by normal readout.

According to the sixth embodiment, the above-described transition of signals for each frame in a moving image is checked, and which of single (non-additional) readout and additional readout is performed for reading out the next frame is determined for each row. FIG. 27 is a flowchart illustrating readout control of the image sensor 1400 according to the sixth embodiment. As described with reference to FIG. 25 in the fifth embodiment, after the accumulation of charge in the two CCDs 409 and 415 has ended by the processing up to S503, the processing of determining whether to perform single readout or additional readout for each row is performed at S600. Here, it is determined whether a pixel whose signal level obtained by normal readout using a single CCD 409 is higher than the first threshold is present in the rows of the previous frame or whether a pixel having a signal level lower than the second threshold is not present in the rows of the previous frame. If YES at S600, additional readout will result in a saturated pixel, or the signal level is sufficient without performing additional readout. Therefore, the process proceeds to S504, at which single readout is performed. If NO at S600, or in other words, a pixel having a signal level lower than the second threshold level L960 is present and a pixel having a signal level higher than the first threshold level L950 is not present, the process proceeds to S601, at which the charges are transferred from the two CCDs 409 and 415 to the FD 411, and are read out. The above processes are repeated from S600 until it is determined in S602 that all rows are read out.

As described above, according to the sixth embodiment, switching between single readout and additional readout is performed for each row, and thereby, only a single readout is necessary for each row. Thus, it is possible to obtain an image of an appropriate output level with a high degree of speed and accuracy. When an appropriate image cannot be obtained by performing setting for each row, the signal level of the entire frame may be checked, and the entire readout may be performed by either single readout or additional readout.

Seventh Embodiment

Figure 28:
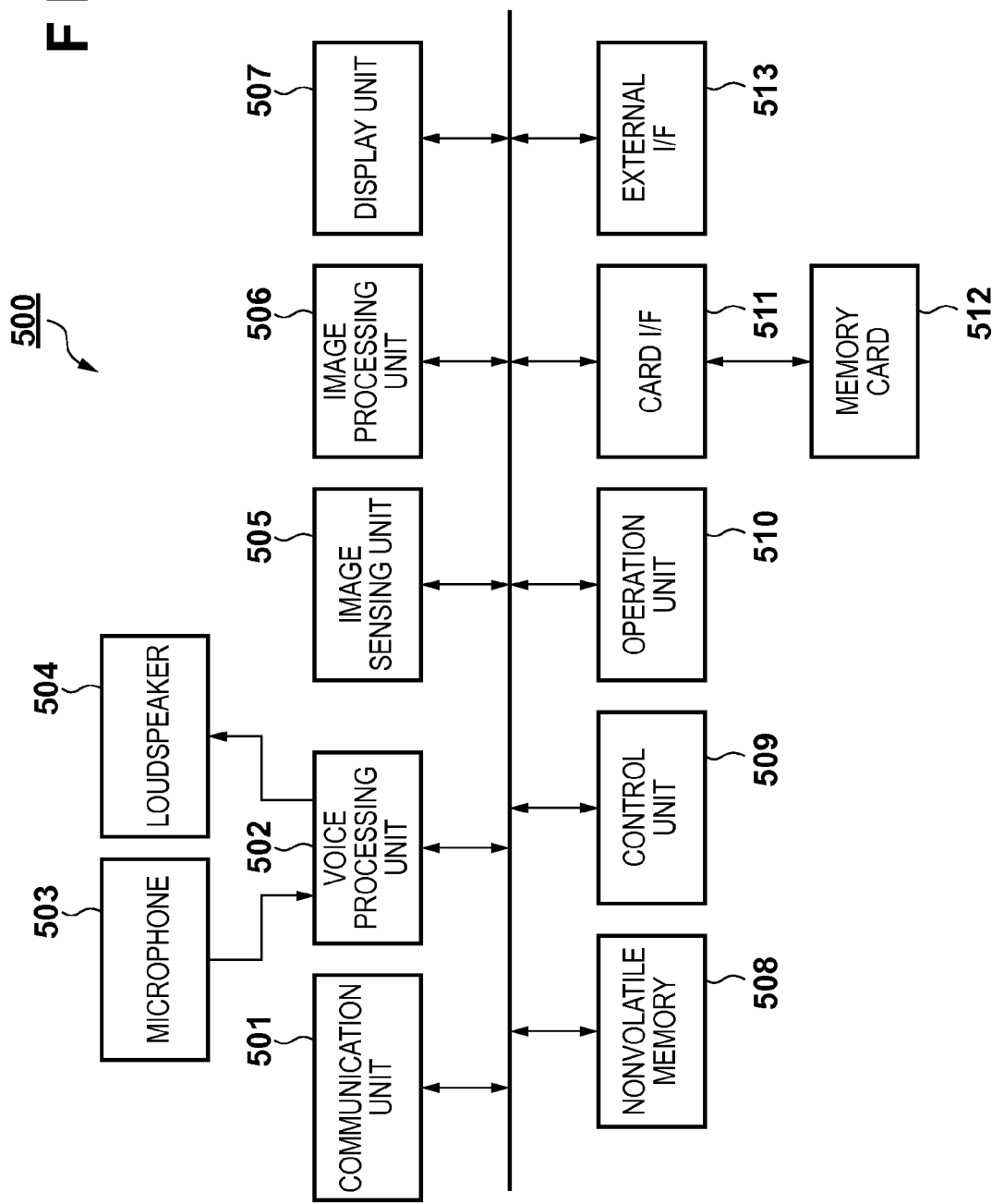
FIG. 28 is a block diagram schematically showing a configuration of a mobile phone according to a seventh embodiment.

FIG. 28 is a block diagram showing an arrangement of a cellular phone 500 according to the seventh embodiment of the present invention. The cellular phone 500 according to the seventh embodiment has the e-mail function, Internet connection function, image shooting/playback function, and the like, in addition to the voice communication function.

In FIG. 28, a communication unit 501 communicates voice data and image data with another phone by a communication method complying with a communication carrier with which the user has a contract. In voice communication, a voice processing unit 502 converts voice data from a microphone 503 into a format suited for origination, and sends the converted data to the communication unit 501. Also, the voice processing unit 502 decodes voice data from a call destination that has been sent from the communication unit 501, and sends the decoded data to a loudspeaker 504.

An image sensing unit 505 includes the image sensor 1400 described in one of the first and sixth embodiments, shoots an image of an object, and outputs image data. At the time of shooting an image, an image processing unit 506 processes image data shot by the image sensing unit 505, converts the data into a format suited for recording, and outputs the converted data. At the time of playing back a recorded image, the image processing unit 506 processes the image to be played back, and sends the processed image to a display unit 507. The display unit 507 includes a liquid crystal display panel about several inches in size, and displays various display contents in accordance with instructions from a control unit 509. A nonvolatile memory 508 stores information of an address book, and data such as data of e-mail and image data shot by the image sensing unit 505.

The control unit 509 includes a CPU and memory, and controls the respective units of the cellular phone 500 in accordance with a control program stored in the memory (not shown). An operation unit 510 includes a power button, number keys, and various other operation keys used to input data by the user. A card I/F 511 records and reads out various data on and from a memory card 512. An external I/F 513 transmits, to an external device, data stored in the nonvolatile memory 508 and memory card 512, and receives data transmitted from an external device. The external I/F 513 performs communication by a well-known communication method such as wireless communication or a wired communication method conforming to, for example, a USB standard.

Next, the voice communication function in the cellular phone 500 will be explained. When calling a call destination, the user operates the number keys of the operation unit 510 to input the number of the call destination, or operates to display, on the display unit 507, an address book stored in the nonvolatile memory 508, selects the call destination, and instructs origination. When the origination is instructed, the control unit 509 originates a call to the call destination via the communication unit 501. If the call destination answers the call, the communication unit 501 outputs voice data of the destination to the voice processing unit 502, and also transmits voice data of the user to the destination.

When transmitting an e-mail, the user instructs creation of a mail by using the operation unit 510. When the creation of a mail is instructed, the control unit 509 displays a mail creation screen on the display unit 507. The user inputs a transmission destination address and body by using the operation unit 510, and instructs transmission. When transmission of the mail is instructed, the control unit 509 sends address information and data of the mail body to the communication unit 501. The communication unit 501 converts the mail data into a format suited for communication, and sends the converted data to the transmission destination. When the communication unit 501 receives an e-mail, it converts the received mail data into a format suited for display, and displays the converted data on the display unit 507.

Next, the image shooting function in the cellular phone 500 will be explained. When the user operates the operation unit 510 to set the shooting mode and then instructs shooting of a still image or moving image, the image sensing unit 505 performs shooting and sends the shot still image data or moving image data to the image processing unit 506. The image processing unit 506 processes the shot still image data or moving image data, and stores the processed data in the nonvolatile memory 508. The image processing unit 506 sends the obtained still image data or moving image data to the card I/F 511. The card I/F 511 stores the still image data or moving image data in the memory card 512.

The cellular phone 500 can transmit, as a file attached to an e-mail, a file including still image data or moving image data shot in this manner. More specifically, when transmitting an e-mail, an image file stored in the nonvolatile memory 508 or memory card 512 is selected, and transmission of the image file as an attached file is instructed.

The cellular phone 500 can also transmit a file including shot still image data or moving image data to an external device such as a PC or another phone via the external I/F 513. The user selects an image file stored in the nonvolatile memory 508 or memory card 512 and instructs transmission, by operating the operation unit 510. The control unit 509 controls to read out the selected image file from the nonvolatile memory 508 or memory card 512, and controls the external I/F 513 to transmit the readout image file to the external device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-254492, filed on Dec. 9, 2013 which is hereby incorporated by reference herein in its entirety.

What is claimed is:

1. An image capturing apparatus, comprising:
an imager including a plurality of pixels, each of the pixels including:
a photoelectric converter;
a plurality of charge accumulation portions which accumulates a charge generated in the photoelectric converter;
a controller which controls accumulation of charge in each of the plurality of charge accumulation portions; and
an output portion which outputs a signal corresponding to the charge from each of the plurality of charge accumulation portions; and
a generator which generates a signal of each of the pixels from the signals respectively output from the plurality of charge accumulation portions,
wherein the photoelectric converter is formed in a first chip, and the plurality of charge accumulation portions, the controller, and the output portion are formed in a second chip, and
wherein the plurality of charge accumulation portions are arranged in parallel.

2. The image capturing apparatus according to claim 1, wherein the controller causes a period of time for accumulating a charge in the plurality of charge accumulation portions to be different for each of the plurality of charge accumulation portions, and
the generator selects, from among the signals respectively output from the plurality of charge accumulation portions, a signal of a larger level that does not reach a saturation level, and controller uses the selected signal as a pixel signal of a corresponding pixel.

3. The image capturing apparatus according to claim 1, wherein the controller performs control such that the period of time for accumulating a charge in the plurality of charge accumulation portions is the same, and
the generator adds signals respectively output from the plurality of charge accumulation portions, and if an added signal resulting from the addition does not reach a saturation level, selects the added signal, and if the added signal reaches the saturation level, selects one of the signals respectively output from the plurality of charge accumulation portions and uses the selected signal as a pixel signal of a corresponding pixel.

4. The image capturing apparatus according to claim 1, wherein the controller performs control such that the period of time for accumulating a charge in the plurality of charge accumulation portions is the same,
the output portion outputs signals obtained by multiplying the signals output from the plurality of charge accumulation portions by gains that are different from one other, and
the generator selects, from among the signals obtained by multiplying the different gains, a signal of a larger level that does not reach a saturation level, and uses the selected signal as a pixel signal of a corresponding pixel.

5. The image capturing apparatus according to claim 1, wherein the controller causes timing of accumulating a charge in the plurality of charge accumulation portions to be different for each of the plurality of charge accumulation portions, and the generator adds the signals respectively output from the plurality of charge accumulation portions, and if an added signal resulting from the addition does not reach a saturation level, selects the added signal, and if the added signal reaches the saturation level, selects one of the signals respectively output from the plurality of charge accumulation portions and uses the selected signal as a pixel signal of a corresponding pixel.

6. The image capturing apparatus according to claim 5, wherein, when one of the signals respectively output from the plurality of charge accumulation portions is selected, the generator selects a signal output from the charge accumulation portion for which accumulation of charge is performed at timing close to the middle of a period during which a charge is accumulated in the plurality of charge accumulation portions.

7. The image capturing apparatus according to claim 5, wherein, when one of the signals respectively output from the plurality of charge accumulation portions is selected, the generator selects a signal output from the charge accumulation portion for which accumulation of charge is performed at timing close to the start of a period during which a charge is accumulated in the plurality of charge accumulation portions.

8. The image capturing apparatus according to claim 5 further comprising a camera shake detection unit, wherein, when one of the signals respectively output from the plurality of charge accumulation portions is selected, the generator selects a signal output from the charge accumulation portion for which accumulation of charge is performed at timing at which there is less influence of camera shake.

9. The image capturing apparatus according to claim 1, wherein the first chip and the second chip are stacked on each other.

10. The image capturing apparatus according to claim 9 further comprising an amplification unit configured to amplify the signal of each of the pixels generated by the generator, according to a condition under which the signal was obtained.

11. The image capturing apparatus according to claim 1, wherein the generator generates signals which have a wide dynamic range from signals respectively output from the plurality of charge accumulation portions as a pixel signal of a corresponding pixel.

12. The image sensing device according to claim 1, wherein the first chip and the second chip are stacked on each other.

13. An image capturing apparatus comprising:
an imager including a plurality of pixels, each of the pixels including:
a photoelectric converter;
a plurality of charge accumulation portions which accumulates a charge generated in the photoelectric converter;
a charge holding portion which holds the charges transferred from the plurality of charge accumulation portions;
a controller which controls accumulation of charge in each of the plurality of charge accumulation portions;

a transfer portion which transfers the charges from the plurality of charge accumulation portions to the charge holding portion; and
an output portion which outputs each of signals corresponding to the charges held in the charge holding portion; and
a generator which generates a signal of each of the pixels from the signals output from the charge holding portion,
wherein the photoelectric converter is formed in a first chip, and the plurality of charge accumulation portions, the charge holding portion, the controller, the transfer portion, and the output portion are formed in a second chip, and
wherein the plurality of charge accumulation portions are arranged in parallel.

14. The image capturing apparatus according to claim 13, wherein the imager performs:
non-additional output in which the charge accumulated in one of the plurality of charge accumulation portions is transferred to the charge holding portion by the transfer portion, and the signal corresponding to the transferred charge is output from the charge holding portion by the output portion; and
additional output in which, after the signal is output by the non-additional output, the charge accumulated in another one of the plurality of charge accumulation portions is further transferred to the charge holding portion by the transfer portion and is added, and the signal corresponding to an added charge resulting from the addition is output from the charge holding portion by the output portion, and,
if a signal obtained by the additional output does not reach a saturation level, the generator selects the signal obtained by the additional output, and, if the signal obtained by the additional output reaches the saturation level, the generator selects the signal obtained by the non-additional output and uses the selected signal as a pixel signal of a corresponding pixel.

15. The image capturing apparatus according to claim 13, wherein the imager reads out a signal for each frame in a predetermined cycle and performs:
non-additional output in which the charge accumulated in one of the plurality of charge accumulation portions is transferred to the charge holding portion by the transfer portion, and the signal corresponding to the transferred charge is output from the charge holding portion by the output portion; and
additional output in which the charges accumulated in the plurality of charge accumulation portions are transferred to the charge holding portion by the transfer portion and added, and the signal corresponding to an added charge resulting from the addition is output from the charge holding portion by the output portion, and
the non-additional output and the additional output are switched for each row or each frame according to a signal level of a previous frame.

16. The image capturing apparatus according to claim 13, wherein the first chip and the second chip are stacked on each other.

17. The image capturing apparatus according to claim 16 further comprising an amplification unit configured to amplify the signal of each of the pixels generated by the generator, according to a condition under which the signal is obtained.

18. The image capturing apparatus according to claim 13, wherein the generator generates signals which have a wide dynamic range from signals respectively output from the plurality of charge accumulation portions as a pixel signal of a corresponding pixel.

19. A method for controlling an image capturing apparatus including:
an imager including a plurality of pixels, each of the pixels including: a photoelectric converter and a plurality of charge accumulation portions which accumulates a charge generated in the photoelectric converter, a controller and an output portion, wherein the photoelectric converter is formed in a first chip, and the plurality of charge accumulation portions, the controller, and the output portion are formed in a second chip, and the plurality of charge accumulation portions are arranged in parallel, the method comprising:
a charge accumulation step of controlling, by the controller, accumulation of charge in each of the plurality of charge accumulation portions;
an output step of outputting, by the output portion, a signal corresponding to the charge from each of the plurality of charge accumulation portions; and
a generation step of generating, by a generator, a signal of each of the pixels from the signals respectively output from the plurality of charge accumulation portions in the output step.

20. The method for controlling an image capturing apparatus according to claim 19, wherein, in the charge accumulation step, a charge is accumulated for a different period of time for each of the plurality of charge accumulation portions, and,
in the generation step, from among the signals respectively output from the plurality of charge accumulation portions, a signal of a larger level that does not reach a saturation level is selected and used as a pixel signal of a corresponding pixel.

21. The method for controlling an image capturing apparatus according to claim 19, wherein, in the charge accumulation step, a charge is accumulated in the plurality of charge accumulation portions for the same period of time, and,
in the generation step, signals respectively output from the plurality of charge accumulation portions are added, and if an added signal resulting from the addition does not reach a saturation level, the added signal is selected, and if the added signal reaches the saturation level, one of the signals respectively output from the plurality of charge accumulation portions is selected, and used as a pixel signal of a corresponding pixel.

22. The method for controlling an image capturing apparatus according to claim 19, wherein, in the charge accumulation step, a charge is accumulated in the plurality of charge accumulation portions for the same period of time,
in the output step, signals obtained by multiplying the signals output from the plurality of charge accumulation portions by gains that are different from one other are output, and,
in the generation step, from among the signals obtained by multiplying the different gains, a signal of a larger level that does not reach a saturation level is selected and used as a pixel signal of a corresponding pixel.

23. The method for controlling an image capturing apparatus according to claim 19, wherein, in the charge accumulation step, a charge is accumulated at different timing for each of the plurality of charge accumulation portions, and,
in the generation step, the signals respectively output from the plurality of charge accumulation portions are added, and if an added signal resulting from the addition does not reach a saturation level, the added signal is selected, and if the added signal reaches the saturation level, one of the signals respectively output from the plurality of charge accumulation portions is selected, and used as a pixel signal of a corresponding pixel.

24. The method for controlling an image capturing apparatus according to claim 23, wherein, in the generation step, when one of the signals respectively output from the plurality of charge accumulation portions is selected, a signal output from the charge accumulation portion for which accumulation of charge is performed at timing close to the middle of a period during which a charge is accumulated in the plurality of charge accumulation portions is selected.

25. The method for controlling an image capturing apparatus according to claim 23, wherein, in the generation step, when one of the signals respectively output from the plurality of charge accumulation portions is selected, the signal output from the charge accumulation portion for which accumulation of charge is performed at timing close to start of a period during which a charge is accumulated in the plurality of charge accumulation portions is selected.

26. The method for controlling an image capturing apparatus according to claim 23 further comprising a step of detecting camera shake by a camera shake detection unit,
wherein, in the generation step, when one of the signals respectively output from the plurality of charge accumulation portions is selected, a signal output from the charge accumulation portion for which accumulation of charge is performed at timing at which there is less influence of camera shake is selected.

27. The method for controlling an image capturing apparatus according to claim 19, wherein the first chip and the second chip are stacked on each other.

28. The method for controlling an image capturing apparatus according to claim 19, further comprising a step of amplifying, by an amplification unit, the signal of each of the pixels generated by the generator, according to a condition under which the signal is obtained.

29. The method for controlling an image capturing apparatus according to claim 19, wherein, in the generation step, signals which have a wide dynamic range are generated from signals respectively output from the plurality of charge accumulation portions as a pixel signal of a corresponding pixel.

30. A method for controlling an image capturing apparatus including:
an imager including a plurality of pixels, each of the pixels including: a photoelectric converter;
a plurality of charge accumulation portions which accumulates a charge generated in the photoelectric converter; a charge holding portion which holds charges transferred from the plurality of charge accumulation portions, a controller, a transfer portion, and an output portion wherein the photoelectric converter is formed in a first chip, and the plurality of charge accumulation portions, the charge holding portion, the controller, the transfer portion, and the output portion are formed in a second chip, and the plurality of charge accumulation portions are arranged in parallel, the method comprising:
a control step of controlling, by the controller, accumulation of charge in each of the plurality of charge accumulation portions;

a transfer step of transferring, by the transfer portion, the charges from the plurality of charge accumulation portions to the charge holding portion;

an output step of outputting, by the output portion, each of signals corresponding to the charges held in the charge holding portion; and a generation step of generating, by a generator, a signal of each of the pixels from the signals output from the charge holding portion.

31. The method for controlling an image capturing apparatus according to claim 30, wherein the imager is controlled by non-additional output or additional output, in the non-additional output,
in the transfer step, the charge accumulated in one of the plurality of charge accumulation portions is transferred to the charge holding portion, and,
in the output step, the signal corresponding to the transferred charge is output from the charge holding portion, and, in the additional output,
in the transfer step, after the signal is output in the non-additional output, the charge accumulated in another one of the plurality of charge accumulation portions is further transferred to the charge holding portion and is added, and,
in the output step, the signal corresponding to an added charge resulting from the addition is output from the charge holding portion, and,
in the generation step, if the signal obtained in the additional output does not reach a saturation level, the signal obtained in the additional output is selected, and if the signal obtained in the additional output reaches the saturation level, the signal obtained in the non-additional output is selected, and used as a pixel signal of a corresponding pixel.

32. The method for controlling an image capturing apparatus according to claim 30, wherein the imager reads out a signal for each frame in a predetermined cycle, and controls the imager by non-additional output or additional output, and in the non-additional output,
in the transfer step, the charge accumulated in one of the plurality of charge accumulation portions is transferred to the charge holding portion, and,
in the output step, the signal corresponding to the transferred charge is output from the charge holding portion, and, in the additional output,
in the transfer step, the charges accumulated in the plurality of charge accumulation portions are transferred to the charge holding portion and added, and
in the output step, the signal corresponding to an added charge resulting from the addition is output from the charge holding portion, and the method further comprises a switching step of switching between the non-additional output and the additional output for each row or each frame according to a signal level of a previous frame.

33. The method for controlling an image capturing apparatus according to claim 30, wherein the first chip and the second chip are stacked on each other.

34. The method for controlling an image capturing apparatus according to claim 30, further comprising a step of amplifying, by an amplification unit, the signal of each of the pixels generated by the generator, according to a condition under which the signal is obtained.

35. An image sensing device comprising:
a plurality of pixels, each of the pixels including:
a photoelectric converter;
a plurality of charge accumulation portions which accumulates a charge generated in the photoelectric converter; and
an output portion which outputs a signal corresponding to the charge from each of the plurality of charge accumulation portions,
wherein the photoelectric converter is formed in a first chip, and the plurality of charge accumulation portions and the output portion are formed in a second chip, and
wherein the plurality of charge accumulation portions are arranged in parallel.

* * * * *